US009490486B2

(12) United States Patent
Adzic et al.

(10) Patent No.: US 9,490,486 B2
(45) Date of Patent: Nov. 8, 2016

(54) METHOD FOR REMOVING STRONGLY ADSORBED SURFACTANTS AND CAPPING AGENTS FROM METAL TO FACILITATE THEIR CATALYTIC APPLICATIONS

(71) Applicant: Brookhaven Science Associates, LLC, Upton, NY (US)

(72) Inventors: Radoslav R. Adzic, East Setauket, NY (US); Kuanping Gong, Cupertino, CA (US); Yun Cai, Berkeley, CA (US); Stanislaus Wong, Stony Brook, NY (US); Christopher Koenigsmann, Mahopac, NY (US)

(73) Assignees: Brookhaven Science Associates, LLC, Upton, NY (US); The Research Foundation for the State University of New York, Albany, NY (US)

(*) Notice: Subject to any disclaimer, the term of this patent is extended or adjusted under 35 U.S.C. 154(b) by 753 days.

(21) Appl. No.: 13/735,919

(22) Filed: Jan. 7, 2013

(65) Prior Publication Data

US 2013/0178357 A1    Jul. 11, 2013

Related U.S. Application Data

(60) Provisional application No. 61/583,307, filed on Jan. 5, 2012.

(51) Int. Cl.
*H01M 4/90* (2006.01)
*H01M 4/92* (2006.01)

(52) U.S. Cl.
CPC ............. *H01M 4/9041* (2013.01); *H01M 4/92* (2013.01); *Y02E 60/50* (2013.01)

(58) Field of Classification Search
CPC .................... C25F 3/02–3/28; H01M 4/9041; H01M 4/92; H01M 4/90
See application file for complete search history.

(56) References Cited

U.S. PATENT DOCUMENTS 6,670,301 B2   12/2003   Adzic et al.
7,691,780 B2    4/2010   Adzic et al.

FOREIGN PATENT DOCUMENTS

WO   WO 2011112608 A1 *  9/2011  ............ B22F 1/0018
WO   WO2012/009467 A1    1/2012

OTHER PUBLICATIONS

J. Yang, J.Y. Lee, J.Y. Ying. "Phase transfer and its applications in nanotechnology" Chemical Society Reviews. Dec. 1, 2010. vol. 40, Issue 3. pp. 1672-1696.*
J.Y. Park, C. Aliaga, J.R. Renzas, H. Lee, G.A. Somorjai. "The Role of Organic Capping Layers of Platinum Nanoparticles in Catalytic Activity of CO Oxidation" Catalysis Letters. Feb. 4, 2009. vol. 129, Issue 1. pp. 1-6.*
Z. Tang, D. Geng, G. Lu. "Size-controlled synthesis of colloidal platinum nanoparticles and their activity for the electrocatalytic oxidation of carbon monoxide" Journal of Colloid and Interface Science. Mar. 15, 2005. vol. 287, Issue 1. pp. 159-166.*
K. Gong, M.B. Vukmirovic, C. Ma, Y. Zhu, R.R. Adzic. "Synthesis and catalytic activity of Pt monolayer on Pd tetrahedral nanocrystals with CO-adsorption-induced removal of surfactants" Journal of Electroanalytical Chemistry. Jul. 23, 2011. vol. 662, Issue 1. pp. 213-218.*
Brankovic, S., et al., "Metal Monolayer Deposition by Replacement of Metal Adlayers on Electrode Surfaces," *Surface Science*, vol. 474, pp. L173-L179, 2001.
Diao, J., et al., "Surface-Stress-Induced Phase Transformation in Metal Nanowires," *Nature Materials*, vol. 2, pp. 656-660, 2003.
Garsany, Y., et al., "Experimental Methods for Quantifying the Activity of Platinum Electrocatalysts for the Oxygen Reduction Reaction," *Analytical Chemistry*, vol. 82, pp. 6321 to 6328, 2010.
Haftel, M., et al., "Density Functional Theory Investigation of Surface-Stress-Induced Phase Transformations in FCC Metal Nanowires," *Physical. Review B*, vol. 74, pp. 035420-1 to 035420-12, 2006.
"Hydrogen, Fuel Cells & Infrastructure Technologies Program," Multi-Year Research, Development and Demonstration Plan: Planned Program Activities for 2005-2015, 2009. (To Be Provided).
Koenigsmann, C., et al., "Size-Dependent Enhancement of Electrocatalytic Performance in Relatively Defect-Free, Processed Ultrathin Platinum Nanowires," *Nano Letters*, vol. 10, pp. 2806 to 2811, 2010, and 7 pages of supplementary information.
Koenigsmann, C., et al., "Enhanced Electrocatalytic Performance of Processed, Ultrathin, Supported Pd—Pt Core-Shell Nanowire Catalysts for the Oxygen Reduction Reaction," *Journal of the American Chemical Society*, vol. 133, pp. 9783 to 9795, 2011 and 10 pages of supporting information.
Koenigsmann, C., et al., "Size- and Composition-Dependent Enhancement of Electrocatalytic Oxygen Reduction Performance in Ultrathin Palladium—Gold ($Pd_{1-x}Au_x$) Nanowires," *The Journal of Physical Chemistry C*, vol. 116, pp. 15297 to 15306, 2012 and 6 pages of supplementary information.
Kondo, Y., et al., "Synthesis and Characterization of Helical Multi-Shell Gold Nanowires," *Science*, vol. 289, pp. 606-608, 2000.
Mazumder, V., et al., "Oleylamine-Mediated Synthesis of Pd Nanoparticles for Catalytic Formic Acid Oxidation," *Journal of the American Chemical Society*, vol. 131, pp. 4588 to 4589, 2009, and 7 pages of supporting information [online] [retrieved Jan. 7, 2013] from the internet <URL: http://pubs.acs.org/doi/abs/10.1021/ja9004915>.

(Continued)

*Primary Examiner* — Steven A. Friday
(74) *Attorney, Agent, or Firm* — Dorene M. Price; Lars O. Husebo

(57) ABSTRACT

A method of synthesizing activated electrocatalyst, preferably having a morphology of a nanostructure, is disclosed. The method includes safely and efficiently removing surfactants and capping agents from the surface of the metal structures. With regard to metal nanoparticles, the method includes synthesis of nanoparticle(s) in polar or non-polar solution with surfactants or capping agents and subsequent activation by CO-adsorption-induced surfactant/capping agent desorption and electrochemical oxidation. The method produces activated macroparticle or nanoparticle electrocatalysts without damaging the surface of the electrocatalyst that includes breaking, increasing particle thickness or increasing the number of low coordination sites.

65 Claims, 14 Drawing Sheets

(56) References Cited

OTHER PUBLICATIONS

Mazumder, V., et al., "Recent Development of Active Nanoparticle Catalysts for Fuel Cell Reactions," *Advanced Functional Materials*, vol. 20, p. 1224 to 1231, 2010.

Medintz, I., et al., "Quantum Dot Bioconjugates for Imaging, Labelling and Sensing," *Nature Materials*, vol. 4, pp. 435-446, 2005.

Sastry, M., "Phase Transfer Protocols in Nanoparticle Synthesis," *Current Science*, vol. 85, pp. 1735 to 1745, 2003.

Teng, X., et al., "Synthesis of Platinum Multipods: An Induced Anisotropic Growth," *Nano Letters*, vol. 5, pp. 885-891, 2005.

Teng, X., et al., "Hybrid Pt/Au Nanowires: Synthesis and Electronic Structure," *The Journal of Physical Chemistry C*, vol. 112, pp. 14696 to 14701, 2008.

Wang, J., et al., "Oxygen Reduction on Well-Defined Core-Shell Nanocatalysts: Particle Size, Facet, and Pt Shell Thickness Effects," *Journal of the American Chemical Society*, vol. 131, pp. 17298 to 17302, 2009 and 2 pages of supporting information.

Yang, J., et al., "Phase Transfer and Its Applications in Nanotechnology," *Chemical Society Reviews*, vol. 40, pp. 1672 to 1696, 2011.

Zhang, J., et al., "Platinum Monolayer Electrocatalysts for $O_2$ Reduction: Pt Monolayer on Pd(111) and on Carbon-Supported Pd Nanoparticles," *Journal of Physical Chemistry B*, vol. 108, pp. 10955 to 10964, 2004.

Zhang, J., et al., "Controlling the Catalytic Activity of Platinum-Monolayer Electrocatalysts for Oxygen Reduction with Different Substrates," *Angewandte Chemie International Edition*, vol. 44, pp. 2132 to 2135, 2005.

Zhang, J., et al., "Platinum Monolayer on Nonnoble Metal-Noble Metal Core-Shell Nanoparticle Electrocatalysts for $O_2$ Production," *The Journal of Physical Chemistry B*, vol. 109, pp. 22701 to 22704, 2005, and 1 page of supporting information.

\* cited by examiner

METHOD FOR REMOVING STRONGLY ADSORBED SURFACTANTS AND CAPPING AGENTS FROM METAL TO FACILITATE THEIR CATALYTIC APPLICATIONS

CROSS-REFERENCE TO A RELATED APPLICATION

This application claims the benefit under 35 U.S.C. 119(e) of U.S. Provisional Application No. 61/583,307 filed on Jan. 5, 2012, the content of which is incorporated herein in its entirety.

STATEMENT OF GOVERNMENT LICENSE RIGHTS

The present invention was made with government support under contract number DE-AC02-98CH10886 awarded by the U.S. Department of Energy. The Government has certain rights in the invention.

FIELD OF THE INVENTION

This invention relates to the field of electrocatalytic monodisperse nanostructures and the methods for their manufacture. In particular, the invention relates to a method of synthesizing electrocatalytic nanostructures in solution and a method of activating such nanostructures by carbon monoxide—adsorption-induced desorption and electrochemical oxidation.

BACKGROUND

Metals such as platinum (Pt), palladium (Pd), ruthenium (Ru), and related alloys are known to be excellent catalysts. When incorporated in electrodes of an electrochemical device such as a fuel cell, these materials function as electrocatalysts since they accelerate electrochemical reactions at electrode surfaces yet are not themselves consumed by the overall reaction. Although noble metals have been shown to be some of the best electrocatalysts, their successful implementation in commercially available energy conversion devices is hindered by their high cost and scarcity in combination with other factors such as a susceptibility to carbon monoxide (CO) poisoning, poor stability under cyclic loading, and the relatively slow kinetics of the oxygen reduction reaction (ORR).

A variety of approaches have been employed in attempting to address these issues. One well-known approach involves increasing the overall surface area available for reaction by forming metal particles with nanometer-scale dimensions. However, a primary challenge with the use of nanoparticulate electrocatalysts is that these zero-dimensional (0D) morphologies possess proportionally higher numbers of defect sites, lattice boundaries, and low coordination atoms at their surfaces. Inherently, defect sites are substantially less active towards oxygen reduction reaction than defect-free crystal planes, largely because of differences in the local coordination geometry and surface energy, which can directly influence the interfacial interaction between the metal surface sites and the adsorbed oxygen species. In addition, defect sites are more readily passivated by the presence of adsorbed OH groups, which decrease the number of active metal surface sites and inhibit catalysis at potentials below 1.0 V. Not surprisingly, defect sites are also irreversibly oxidized more readily under operating potentials of 0.7 V, resulting in enhanced catalyst degradation, and thus, the 0D catalysts lack sufficient durability for long-term usage in practical, functional fuel cells.

Noble metal nanostructures possessing one-dimensional (1D) morphologies have been highlighted as the structural motif that may solve many of the inherent catalytic problems associated with the nanoparticulate catalysts. Specifically, 1D nanostructures are characterized by their uniquely anisotropic nature, which imparts advantageous structural and electronic factors in the catalytic reduction of oxygen. For instance, the structural anisotropy of highly crystalline (crystallized) 1D motifs results in the preferential exposure of low energy crystalline planes so as to minimize the surface energy of the system. In the case of platinum, the low energy (111) and (110) facets are most active toward oxygen reduction reaction in perchloric acid solution, thereby making these anisotropic structures uniquely advantageous as oxygen reduction reaction electrocatalysts. Similarly, the preferential display of smooth crystalline planes minimizes the number of undesirable low-coordination defect sites, which is expected to enhance both ORR activity and long-term durability. These factors are expected to culminate in the suppression of the cathodic overpotential by delaying surface passivation of adsorbed OH groups to higher potentials and thereby increasing the interfacial ORR kinetics. Despite these tangible gains, continued improvement is necessary in order to meet the 2015 U.S. Department of Energy (DOE) target for performance in an oxygen reduction environment under membrane electrode assembly (MEA) conditions, namely a platinum group metal mass activity of 0.44 A/mg (at 0.9 V).

A promising route toward improving noble metal, e.g., platinum (Pt), mass activity has been the development of core-shell nanoparticles in which a core particle is coated with a shell of a different material which functions as the electrocatalyst. The core is usually a low cost material which is easily fabricated whereas the shell comprises a more catalytically active noble metal. An example is provided by U.S. Pat. No. 6,670,301 to Adzic, et al. which discloses a process for depositing a thin film of Pt on dispersed Ru nanoparticles supported by carbon (C) substrates. Another example is U.S. Pat. No. 7,691,780 to Adzic, et al. which discloses platinum- and platinum-alloy coated palladium and palladium alloy nanoparticles. Each of the aforementioned U.S. patents is incorporated by reference in its entirety as if fully set forth in this specification.

Typically, the synthesis of the electro catalyst nanostructures made with noble and non-noble metals, including the core particle of the core-shell nanoparticles can be achieved via a polyol process, photochemical routes, seeded growth or site-selective lithographic approaches. (Teng et al., *J Phys. Chem. Lett.* 112, 2008, 14696-14701; incorporated herein by reference in its entirety). However, these methods provide limited ability to finely control the size, morphology, phase-segregation, and position of the components in the crystal based nanostructures, partially reflecting the structural complexity imposed by the random nucleation of the metal component.

Solution-based synthesis with directing, dispersing and capping agents, e.g., phase-transfer, is an important synthetic strategy, which is widely applied to control morphology and/or spatial orientation of inorganic crystals. In particular, metallic nanoparticles of different shapes and sizes can be obtained via either a direct synthesis in the organic phase, or by transferring nanoparticles from the aqueous phase to the organic phase. The latter has the advantage of leveraging many existing methods for preparing metallic nanoparticles in the aqueous phase, and avoiding the use of expensive organometallic precursors. On the other hand, the low interfacial energies observed in non-polar organic solvents may enable better control during surface and solution processing. A detailed description of the available phase transfer procedures to generate metallic nanoparticles is provided in Sastry (*Curr. Sci.,* 2003, 85, 1735-1745) and Medintz et al. (*Nat. Mater.,* 2005, 4, 435-446). Each of the aforementioned publications is incorporated by reference in its entirety as if fully set forth in this specification.

For example, the Brust-Schiffrin method is the earliest solution based phase transfer approach for preparing stabilized metal nanoparticles, such as gold (Au). In this approach, the gold ions from an aqueous solution were first extracted to a hydrocarbon phase, e.g. toluene, using tetraoctylammonium bromide (TOAB) as the phase transfer agent. The transfer of gold ions was facilitated by the electrostatic attraction between the positively charged tetraoctylammonium anions and the negatively charged tetrachloroauric cations. Subsequent reduction reactions took place in the organic solution using an aqueous $NaBH_4$ solution in the presence of an alkanethiol, yielding Au nanoparticles of ~2.5 nm. (Yang et al., *Chemical Society Review* 40, 2011, 1672-1696; incorporated herein by reference in its entirety) In the phase-transfer approach, surfactants or other capping agents are added during synthesis to function as the directing agent(s) to influence the growth of the crystal into a desired motif by preferential adsorption to different crystal faces during the growth. The surfactants may also function as dispersing agent(s), e.g., a soft micellar template, to prevent particle agglomeration. Once the desired size and shape have been achieved, the crystal growth is stopped through rapid reduction. These solution chemistry methods have been used, for example, to make nanoparticles of palladium (Pd), gold (Au), rhodium (Rh), iridium (Ir), ruthenium (Ru), osmium (Os), rhenium (Re), nickel (Ni), cobalt (Co), iron (Fe), copper (Cu), and combinations thereof.

Although, the solution based synthesis affords careful control of the size, shape, and composition that allows the properties of various noble metals, particularly palladium and platinum, to be varied, the method inherently deactivates the electrocatalytic functionality of the synthesized nanostructures. Thus, in order to utilize these nanoparticles as electrocatalysts they must be activated by efficiently removing capping agents and surfactants from the surface of the metallic nanostructures without causing increased nanoparticle thickness, breakage, or undesirable low coordination sites. Traditionally, removal of the organic material requires the use of additional washing and/or heating processes. However, even with the appropriate cleaning steps, a residual organic layer typically remains on the surfaces of the nanoparticles. Alternatively, the residual organic layer made from surfactants and capping agents can be removed through oxidation by acid wash or UV generated ozone treatment. The procedure, however, may require up to several hours of exposure, which inadvertently leads to unwanted oxidation of the nanoparticles themselves, thereby generating undesirable low coordination sites.

There is, therefore, a continuing need to develop methods for effectively activating nanostructure electrocatalysts necessary for large-scale and cost-effective processes suitable for commercial production and incorporation in conventional energy production devices without damaging the surface of the generated nanostructures.

SUMMARY

A method of synthesizing activated electrocatalyst, preferably having a morphology of a nanostructure, is disclosed. The method is based on safely and efficiently removing surfactants and capping agents from the surface of the metal electrocatalytic structure(s). The method includes at least: (i) providing electrocatalyst(s) having a plurality of surfactants and/or capping agents on its surface and (ii) stripping surfactants and/or capping agents off the electrocatalyst without damaging its surface. The electrocatalyst may be activated by stripping surfactants and/or capping agents.

In an embodiment, the surfactants and/or capping agents are safely removed from the metal structure without imparting any damage to the metal structure surface by displacing surfactants/capping agents on the surface with carbon monoxide (CO) and subsequent stripping of the carbon monoxide by electrochemical oxidation. In another embodiment, before displacing surfactants/capping agents with carbon monoxide (CO), the synthesized metal structures can be acid washed or ozone treated for up to 30 minutes to weaken the interaction of the surfactant and capping agents to the surface of the metal structures.

The activated or stripped structures may take any form and size, such as nanostructures, microstructures, and macrostructures. The resulting activated nanostructures may form nanoparticles, nanowires, nanosheets, nanotubes, nanorods, and core-shell nanostructures composed of an active crystal lattice made from palladium (Pd), gold (Au), rhodium (Rh), iridium (Ir), ruthenium (Ru), osmium (Os), rhenium (Re), nickel (Ni), cobalt (Co), iron (Fe), copper (Cu), or alloys or combinations thereof. It is to be understood that palladium (Pd), gold (Au), rhodium (Rh), iridium (Ir), ruthenium (Ru), and osmium (Os) are the noble metals and rhenium (Re), nickel (Ni), cobalt (Co), iron (Fe), and copper (Cu) are non-noble metals that may be used in the disclosed method of synthesizing active electrocatalytic nanostructure(s). However, it is to be understood that the disclosed methods can be applied to microstructures and macrostructures with equal success.

In an embodiment in which the disclosed method is applied to nanostructures, the method may include at least: (i) synthesis of nanostructure(s) in polar or non-polar solvents with an aide of surfactants and capping agents to direct and maintain the desired shape and size of the growing crystal lattice; and (ii) activation of the nanostructure(s) by stripping surfactants and/or capping agents off the nanostructure without damaging the nanostructure surface.

Initially, the nanostructures or the nanoparticle cores of a suitable metal or metal alloy are prepared using any technique which is well-known in the art that employs surfactants and/or capping agents during synthesis. The method may include a solution phase crystal growth of nanostructures of desired shape and size that encompasses chemically reducing a mixture of a salt of a noble or non-noble metal dissolved in polar or non-polar solvent in presence of a surfactant or a capping agent, with or without a carbon nanoparticle support, under an inert atmosphere, e.g., Ar, $N_2$, etc., to initiate crystal growth. Alternatively, the nanostructure may be generated under $O_2$ in order to generate 0D nanoparticles. These solution based methods can be used, for example, to make nanoparticles of noble and non-noble metal selected from the group consisting of palladium (Pd), gold (Au), rhodium (Rh), iridium (Ir), ruthenium (Ru), osmium (Os), rhenium (Re), nickel (Ni), cobalt (Co), iron (Fe), copper (Cu), and combinations or alloys thereof.

After the completion of the crystal growth, the as-prepared nanostructures can be activated by displacing surface ligands, i.e., surfactants and capping agents, with carbon monoxide (CO) followed by CO stripping. Adsorption of CO may be achieved by immersing the nanostructures in a CO-saturated solution. Once the displacement is completed, the nanostructures are washed to remove displaced surfactants, capping agents, and excess CO dissolved in the solution. The only CO that remains after washing is CO adsorbed to the surface of the nanostructures. In an embodiment, the adsorbed CO is subsequently stripped from the surface of the nanostructures by a potential sweep, running up to, for example, 1.1 V at 20 mV/s. After displacement of surfactant and capping agents and stripping of CO, the nanostructures are clear, damage-free and ready for further catalytic application.

These and other characteristics of the activated electrocatalytic structure(s) and a method of synthesis thereof will become more apparent from the following description and illustrative embodiments which are described in detail with reference to the accompanying drawings. Similar elements in each figure are designated by like reference numbers and, hence, subsequent detailed descriptions thereof may be omitted for brevity.

DETAILED DESCRIPTION

Figure 1:
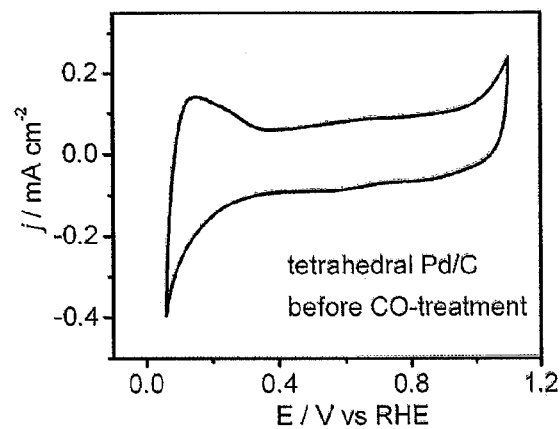
FIG. 1 is a graph showing a voltammetry curve of tetrahedral palladium (Pd) nanoparticles protected by PVP (polyvinylpyrrolidone) surfactant in 0.1 M $HClO_4$ (sweep rate: 20 mV/s).

The disclosed invention provides a new method of synthesizing activated electrocatalytic metal structures. The method includes: (1) forming desired metal structures, for example by using solution phase crystal growth synthesis and (2) activating the metal structures by CO induced desorption and subsequent CO stripping by electrochemical oxidation. The metal structures may be composed of an activated crystal lattice made from noble or non-noble metals selected from palladium (Pd), gold (Au), rhodium (Rh), iridium (Ir), ruthenium (Ru), osmium (Os), rhenium (Re), nickel (Ni), cobalt (Co), iron (Fe), copper (Cu), or alloys or combinations thereof. It is to be understood that the activated electrocatalytic structure has the desired morphology with less than about 2% of its surface inhibited by surfactants or capping agents, such as less than about 1%. In an embodiment, the metal structures prepared using the disclosed method are nanostructures such as nanoparticles, nanowires, nanotubes, nanorods, nanosheets, and core-shell nanostructures.

The method includes at least generating, synthesizing or providing a metal catalyst structure having surfactants and/or capping agents on its surface that may inhibit its catalytic activity. In an embodiment, electrocatalytic structures, e.g., electrocatalytic nanostructures, can be produced using solution based synthesis with the aid of surfactants and capping agents known in the art. However, other methods of synthesizing electrocatalytic metal structures known in the art are also contemplated as long as the resulting structures have surfactants and/or capping agents on their surface that may inhibit their catalytic activity. The method further comprises subsequent activation by substituting surface adsorbed surfactants and capping agents with CO that can be easily stripped using electrochemical oxidation. Thereby, the method affords safe and efficient removal of surfactants and capping agents and the production of one or more activated structures ready for use or further processing.

While it is possible to eliminate surfactants and capping agents from the surface of the synthesized structure by heat treatment, acid wash, or time-controlled UV-ozone exposure, it is anticipated that such protocols may not completely remove a residual organic layer. It is believed that complete activation using only heat treatment, acid wash or time-controlled UV-ozone exposure would result in surface oxidation of the metal structures beyond acceptable levels that will substantially damage the surface of the structure(s) and undesirably impede the electrochemical performance of the manufactured structures as electrocatalysts. Therefore, activating the structures by CO induced desorption and subsequent CO stripping by electrochemical oxidation provides a significant improvement over the procedures known in the art. It is to be understood, however, that those skilled in the art may develop other combinatorial, structural, and functional modifications to the disclosed method of synthesizing surfactant and capping agent-free electrolytic metal structures, and preferably electrolytic nanostructures, without significantly departing from the spirit and scope of the disclosed invention.

I. Synthesis of the Electrocatalytic Structures

While the disclosed method of synthesizing the electrocatalytic structures is described with reference to electrocatalytic nanostructures, it is to be understood that the method can be equally applied to removing surfactants and capping agents from the surface of the electrocatalytic metal structures of any size and shape without departing from the spirit and scope of the disclosed invention.

Electrocatalytic nanostructures, which are also known as nanocrystals have been formed from a wide variety of materials using a number of different techniques which involve both top-down and bottom-up approaches. Examples of the former include standard photolithography techniques, dip-pen nanolithography, and focused ion-beam etching. The latter comprises techniques such as electrodeposition or electroplating onto templated substrates, laser ablation of a suitable target, vapor-liquid-solid growth of nanowires, and growth of surface nanostructures by thermal evaporation, sputtering, chemical vapor deposition (CVD), or molecular beam epitaxy (MBE) from suitable gas precursors and/or solid sources. Nanostructures may also be formed using conventional powder-processing techniques such as comminution, grinding, or chemical reactions. Examples of these processes include mechanical grinding in a ball mill, atomization of molten metal forced through an orifice at high velocity, centrifugal disintegration, sol-gel processing, and vaporization of a liquefied metal followed by supercooling in an inert gas stream. Nanoparticles synthesized by chemical routes may involve solution-phase growth in which, as an example, sodium boron hydride, superhydride, hydrazine, or citrates may be used to reduce an aqueous or nonaqueous solution comprising salts of a non-noble metal and/or noble metal. Alternatively, the salt mixtures may be reduced using H$_2$ gas at temperatures ranging from 150° C. to 1,000° C. These chemical reductive methods can be used, for example, to make nanoparticles of palladium (Pd), gold (Au), rhodium (Rh), iridium (Ir), ruthenium (Ru), osmium (Os), rhenium (Re), nickel (Ni), cobalt (Co), iron (Fe), and copper (Cu). These chemical reductive methods can also be used to make multimetallic (bimetallic, ternary, quaternary composite) nanoparticles. For example, bimetallic nanoparticles include, but not limited to, PdPt, PdCu, PdAu, PtFe, and PtAu. In an embodiment, the disclosed methods are used to make nanoparticles having Pd$_{1-x}$Au$_x$, where x is selected from 0.1 to 0.9. A detailed description of these bimetallic nanoparticles is provided in Koenigsmann et al. (*J. Phys. Chem. C* 2012, 116, 15297-15306), the disclosure of which is incorporated herein by reference in its entirety. The salt of the metal may be chosen from: one or more of the following: nitrate, sulfate, chloride, acetylacetonate, ammonium hexachloroplatinate, ammonium hexachloroiridate salts, or combinations or mixtures thereof. Powder-processing techniques are advantageous in that they are generally capable of producing large quantities of nanometer-scale particles with desired size distributions. A detailed description of these techniques is provided in PCT Application No. PCT/US2011/43901, which is incorporated herein by reference in its entirety.

A nanostructure may be formed by adding a chemical reducing agent to a solution comprising a polar or a nonpolar solvent, a salt of the desired metal and one or more surfactants and/or one or more capping agents. A suitable polar solvent may comprise, for example, toluene, chloroform or dimethyl sulfoxide (DMSO). A suitable surfactant to reduce agglomeration and uniform distribution may comprise, for example, octadecylamine (ODA), polyvinylpyrrolidone, and oleic acid. A suitable capping agent to maintain a desired size may comprise, for example, formaldehyde, and halide. A typical reducing agent is $NaBH_4$ or $N_2H_4$ being added as necessary to reduce the solution. In order to mitigate a phase transfer, the solution may also comprise a phrase transfer agent. A typical phase transfer agent is dodecyltrimethyl-ammonium bromide (DTAB) or phosphonium halide(s).

An exemplary solution which may be used to form Pd nanostructures comprises about 13 mg of palladium nitrate, about 400 mg of ODA and about 60 mg of DTAB in about 0.7 ml of toluene. Prior to adding the reducing agent to reduce the Pd nanoparticles, the solution is preferably sonicated and deaerated. The reduction process proceeds by adding a small amount of the reducing agent dissolved in deoxygenated distilled water to the slurry while vigorously stirring the solution in a deaerated environment at room temperature to produce Pd nanoparticles. In an embodiment, the generated Pd nanoparticles precipitate as black solids and are subsequently washed with ethanol and air dried.

In another embodiment a nanostructure may be formed by adding a chemical reducing agent to a non-polar solution comprising a salt of the desired metal and one or more surfactants and/or one or more capping agents. A suitable surfactant to reduce agglomeration and uniform distribution may comprise, for example, sodium oleate, aerosol OT (AOT), octadecylamine (ODA), polyvinylpyrrolidone, and oleic acid. A suitable capping agent to maintain a desired size may comprise, for example, formaldehyde, halide, citric acid, thiol, and carbon monoxide. A typical reducing agent is $NaBH_4$ or $N_2H_4$ with NaOH or $Na_2CO_3$ being added as necessary to adjust the solution pH. An exemplary solution which may be used to form Ni nanostructures on a carbon support comprises 10 mg carbon powder, 3 ml $H_2O$, and 1 ml 0.1 M $NiSO_4$ or $NiCl_2$. Prior to adding the reducing agent to reduce the Ni nanoparticles, the solution is preferably sonicated and deaerated. The reduction process proceeds by adding a small amount of the reducing agent to the slurry while vigorously stirring the solution in a deaerated environment at room temperature to produce Ni nanoparticles dispersed on a carbon powder support. In a particular embodiment, an excess of Ni ions is contained in solution to ensure that the reducing agent that is added to the solution is fully consumed.

In yet another embodiment, a nanostructure may be formed on a suitable support material by pulse electrodeposition in presence of suitable surfactants and/or capping agents to reduce the agglomeration of particles and achieve a more uniform distribution. This method involves initially preparing a thin film of a carbon powder on a glassy carbon electrode. Prior approaches have typically used a thin layer of Nafion, a polymer membrane, to affix the carbon powder onto the glassy carbon electrode. However, in this embodiment Nafion is not needed since a thin film of carbon powder is formed directly onto the glassy carbon electrode. A pH-buffered solution containing a salt of the metal to be reduced is then produced with a suitable surfactant or a capping agent and the carbon-coated electrode is immersed in the solution. Reduction of the metal itself is accomplished by applying a first potential pulse to reduce the metal ions from solution and nucleate metal nanoparticles on the surfaces of the carbon powder support. This is followed by a second potential pulse whose duration is used to control the final size of the thus-formed nanostructures. The size of the synthesized nanostructures may range between 1 nm and 600 nm depending on the morphology of the nanostructure. For instance, a nanotube may have a size of 200 nm, while an ultrathin nanowire may have size of less than 2 nm.

The first potential pulse is thus used to control the nucleation rate whereas the second potential pulse is used to drive subsequent growth of the nucleated nanostructure particles. By using two separate potential pulses, both the number density and size of nanostructures produced can be independently controlled by the duration of the pulses at the two potentials. In one embodiment, the first potential pulse is accomplished by a sweep that may range from −0.5 V to −0.2 V while the second potential pulse is accomplished by a sweep that may range from −0.3 V to −0.1 V. In another embodiment the first potential pulse is a sweep that may range from −1.6 V to −1.0 V whereas the second potential pulse is a sweep that ranges from −0.9 V to −0.7 V. All potential pulses are measured versus a Ag/AgCl (3 M NaCl) reference electrode.

When forming nanostructures from a solution containing noble metal ions, the pH of the solution is preferably less than 2. A suitable noble metal solution for producing Pt nanoparticle cores may comprise, for example, 10 mM $K_2PtCl_4$ and 0.5 M $H_2SO_4$. Suitable surfactants to reduce agglomeration and uniform distribution may comprise, for example, octadecylamine (ODA), polyvinylpyrrolidone, and oleic acid. Suitable capping agents to maintain a desired size may comprise, for example, formaldehyde, halide, citric acid, thiol, and carbon monoxide. Pulse potential deposition of Pt nanostructures may then proceed by applying a first potential sweep in the range of −0.5 V to −0.2 V followed by a second potential sweep in the range of −0.5 V to −0.1 V. All potentials are measured using a Ag/AgCl (3 M NaCl) reference electrode. The pulse and sweep durations may be adjusted to attain the desired density and size distribution.

When forming nanostructures from a solution containing non-noble metal ions, the pH of the solution is preferably higher than 4 so that the metal nanoparticles formed after electrochemical potential deposition will be stable. Suitable non-noble metal solutions to produce Ni or Co nanostructure may comprise 0.1 M to 0.5 M $NiSO_4$ or $CoSO_4$, respectively, with 0.5 M $H_3BO_3$. It is conceivable that other soluble salts of Ni may also be used. A suitable surfactant to reduce agglomeration and promote uniform distribution may comprise, for example, sodium dodecyl sulfate, octadecylamine (ODA), polyvinylpyrrolidone, and oleic acid. A suitable capping agent to maintain a desired size may comprise, for example, formaldehyde, halide, citric acid, thiol, and carbon monoxide. Electrochemical potential deposition of Ni or Co nanostructures may then proceed by applying a first potential sweep in the range of −1.6 V to −1.0 V followed by a second potential sweep in the range of −0.9 V to −0.7 V. All potentials are measured versus a Ag/AgCl (3 M NaCl) reference electrode with the pulse duration being adjusted to obtain the desired density and size distribution.

It is to be understood that the methods of forming the nanoparticles described above are merely exemplary. Any of a plurality of alternative methods which are well-known in the art and which are capable of forming nanoparticles with the desired shape, size, and composition may be employed where some type of surfactant and/or capping agent is used, as long as the surfactants and capping agents found on the surface of the synthesized nanostructures are removed to maximize the catalytic activity of the resulting nanostructures.

II. Activation with Carbon Monoxide

At this stage of synthesis, the produced nanostructures have varying degrees of surfactants and capping agents absorbed on their surface that substantially limit the catalytic capability of the crystal nanostructures. The presence of surfactants and capping agents on the surface of the generated nanostructures, e.g., Pd and Pt, block access of oxygen to the catalytic sites, thereby slowing kinetics of the oxygen reduction reaction (ORR). To ensure the removal of surfactants and capping agents without structurally compromising the uniquely advantageous nanostructure surface, e.g., creation of the low-coordination sites, the synthesized nanostructures are treated with carbon monoxide (CO) to selectively displace surfactants and capping agents. It is believed that CO strongly coordinates with the surface of noble or non-noble transition metals under slightly reducing potentials and displaces undesirable organic residues.

In an embodiment, CO is bubbled through the suspension of nanoparticles in a suitable solvent, e.g., 0.05-0.3 M perchloric acid, for 0.1 to 6 hours under ambient temperature and pressure. In another embodiment, CO is bubbled through the suspension of nanoparticles in a suitable solvent for 30 to 60 minutes under ambient temperature and pressure. In this embodiment the CO-saturated solution is a solution of perchloric acid with at least 2% CO. Since the solubility of CO in water at 20 C is 2.6 mg/100 ml $H_2O$, the volume percentage will be ~2%. Other suitable solvents include, but are not limited to, nitric acid, phosphoric acid and sulfuric acid. An exemplary procedure comprises depositing the synthesized nanostructures on a carbon electrode by a method described in Brankovic et al. (*Surf Sci.* 2001, 474, L173-L179; incorporated herein by reference in its entirety) and Zhang et al. (*J. Phys. Chem. B* 2004, 108, 10955, 10964; incorporated herein by reference in its entirety) to form a uniform catalyst layer. For CO adsorption induced surfactant/capping agent desorption, the electrode is immersed in a CO-saturated perchloric solution, e.g., 0.1 M, under a CO blanket for about 30 minutes.

Subsequently, the pristine surfaces of the catalyst can be readily exposed by electrochemical oxidation to strip the adsorbed CO. In an embodiment, the electrode with a CO-treated uniform catalyst layer is transferred to a fresh electrolyte, such as 0.1M $HClO_4$ and 0.1M $H_2SO_4$. The CO stripping from nanostructures may then proceed by applying a single potential sweep in the range of 0.7 V to 1.5 V, preferably 1.0 to 1.4 V and more preferably 1.1 to 1.3 V. All potentials are measured versus a Ag/AgCl (3 M NaCl) reference electrode with the sweep rate being adjusted to obtain the desired CO desorption. In some embodiments, if necessary, a second sweep may be applied for complete removal of CO.

In an embodiment, the interaction of the coordinated organic molecules, such as surfactants and capping agents, with the surface of the nanostructures can be first weakened either by acid or ozone treatment before preferential adsorption of a CO monolayer. Without being bound by theory, it is believed that the strong interaction between the terminal amine functionality and the metal surface in combination with the strongly hydrophobic end groups of the adsorbed surfactant: (i) block the active metal, e.g., Pd and Pt, surface sites and (ii) prevent effective transport of reactants onto the surface of the metal. One aspect of the surfactant and the capping agent removal by utilizing ozone treatment and the CO adsorption and stripping is the preservation of the morphology and dispersion of the noble metal nanostructures. The preservation of the morphology and dispersion of the noble metal nanostructures contributes to optimal catalytic performance.

The first treatment method involves the use of an acid wash protocol similarly utilized, for oleylamine-capped Pd nanoparticles and disclosed in Mazumder et al. (*J. Am. Chem. Soc.* 2009, 131, 4588-4589), the disclosure of which is incorporated herein by reference in its entirety. Acid treatments are widely utilized in nanomaterial purification, particularly in the treatment of carbon nanotubes and plasma etched thin films of noble metals. Alternatively, the synthesized nanostructures may utilize an acid treatment described in Koenigsmann et al. (*Nano Lett.* 2010, 10, 2806-2811; incorporated herein by reference in its entirety) used to purify ultrathin Pt nanowires. The second treatment involves the time-controlled exposure of the synthesized nanostructures to UV-generated ozone in order to weaken the interaction between the residual surfactants, e.g., ODA, and the surface of the nanostructures, e.g., Pd, thereby allowing for effective removal of the surfactant by selective CO adsorption. A detailed description of this approach is provided in Koenigsmann et al. (*J. Am. Chem. Soc.* 2011, 133, 9783-9795), the disclosure of which is incorporated herein by reference in its entirety.

The described acid wash and ozone treatment may be used to remove surfactants and capping agents and activate the nanostructure without the use of CO-adsorption-induced surfactant/capping agent desorption. However, those skilled in the art would recognize that the oxidation and removal of the organic molecules may take up to several hours of exposure, which will result in an unwanted oxidation of the nanoparticle, thereby producing undesirable low coordination sites. In contrast, combining acid wash or ozone treatment with CO eliminates this problem because the nanostructures are exposed to acid or ozone for significantly shorter periods of time, e.g., 5-40 minutes. The exposure to acid or ozone partially oxidizes the carbon chains and the terminal amine functional groups. The partial oxidation weakens the interaction of the surfactant with the surface. Thus, by suitably oxidizing the terminal amine functional group, the interaction between the surfactant and the metal surface can be sufficiently reduced so as to allow for enhanced adsorption of CO to the surface.

In one embodiment, the nanostructure with the surfactants and capping agents present on its surface can be exposed to a gaseous ozone generated by any method known in the art. For example, the ozone can be generated by a corona discharge method, ultraviolet light (UV), cold plasma or electrolysis. The amount of ozone employed in weakening the interaction of the organic residues of the surfactants and capping agents with the surface of the nanostructure is not particularly limited and depending on the time of the exposure to the UV source may range between 5 and 40 minutes. An ozone exposure for a longer period of time will result in an unwanted oxidation of the nanostructure that can produce undesirable low coordination sites. The nanostructures may be dispersed in an alcohol and/or organic solvent, such as ethanol to prevent agglomeration, prior to an ozone treatment.

In another embodiment, the UV-ozone pre-treatment may be substituted with an acid treatment for weakening of the interaction of the organic residues with the nanostructures. In this embodiment, the nanostructures are refluxed in an acid selected from, for example, perchloric acid, fluorosulfuric, trifluoromethanesulfonic, and perfluoroalkylsulfonic, sulfuric acid, phosphoric acid, polyphosphoric acid, hydrochloric acid, nitric acid, or glacial acetic acid. The duration of the treatment may be limited to between 5 and 120 minutes depending on the acid selected to avoid the production of the undesirable low coordination sites. For example, if a glacial acetic acid is used, about 1 hour was found to be sufficient to weaken the interaction of the organic residues with the nanostructures. Although, this method is successful in removing the organic residues, the acid treatment results in significant aggregation and agglomeration and a corresponding loss of the advantageous morphology of the noble metal nanostructures. Thus, the acid treatment protocol may result in a significantly lower oxygen reduction performance of the treated noble metal nanostructures, as compared with those treated by the gaseous ozone.

The high performance of the ozone treated nanostructure results from the observation that the ozone process maintains both the dispersion and morphology of the nanostructure, which are crucial factors in determining the overall catalytic effectiveness of the noble metal nanostructures. In particular, ozone-treated nanowires were found to maintain outstanding area and mass specific activities of 0.77 mA/cm$^2$ and 1.83 A/mg, respectively. These were significantly enhanced as compared with commercial Pt nanoparticles, core-shell nanoparticles, and acid treated nanowires. Ozone-treated nanowires also maintained excellent electrochemical durability under accelerated half-cell testing, and it was found that the area-specific activity increased by 1.5 fold after a simulated lifetime.

While the methods of synthesizing activated nanostructures have been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

EXAMPLES

The examples set forth below also serve to provide further appreciation of the disclosed invention, but are not meant in any way to restrict the scope of the invention.

Example 1

Pd tetrahedral nanoparticles were synthesized by a modified phase-transfer method adopted from Teng (2008). Specifically, the precursor mixture was prepared by vigorously mixing inorganic palladium nitrate Pd(NO$_3$)$_2$ (Alfa Aesar, 99.9%; 13 mg) octadecylamine (ODA) (Aldrich, 97%; 0.4 g, 1.5 mmol) and n-dodecyltrimethylammonium bromide (DTAB) (Aldrich, 98%; 60 mg, 0.2 mmol) in toluene (7 mL). All solvents were degassed by bubbling argon through them for at least ten minutes before use. The mixture was brought under an inert atmosphere, utilizing standard Schlenk procedures, and sonicated for 20 min.

Figure 2A:
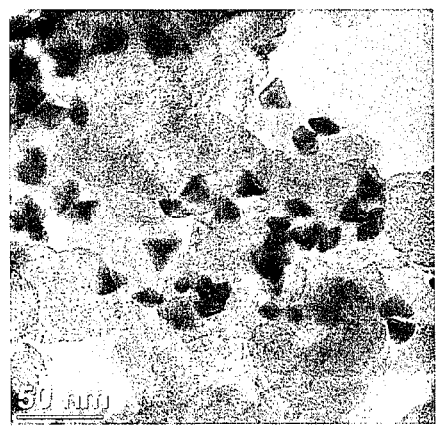
FIG. 2A is a high resolution TEM image of the palladium (Pd) tetrahedral particles.
Figure 2B:
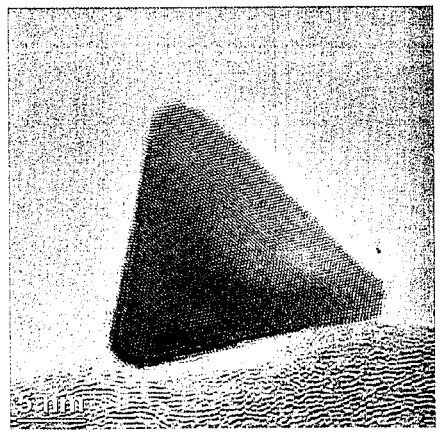
FIG. 2B is an expanded region of the TEM image from FIG. 2A of a single tetrahedral particle.
Figure 2C:
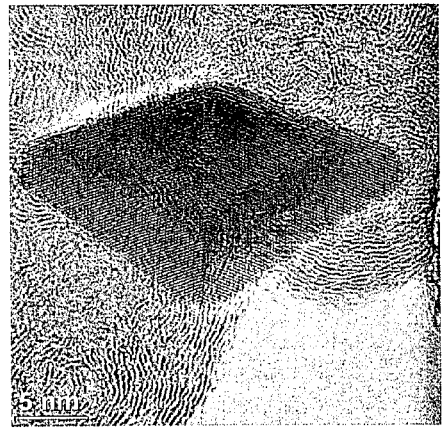
FIG. 2C is an expanded region of the TEM image from FIG. 2A of a single octahedral particle.

Separately, solid sodium borohydride (NaBH$_4$) (13 mg, Alfa Aesar 98%) was dissolved into 2 mL of deoxygenated distilled water, and the solution was added dropwise to the precursor mixture, while stirring to reduce the palladium cations to form tetrahedral nanostructures (TNs) (see FIGS. 2A-2C). After 1 h, the reaction mixture was diluted with 2 mL aliquots of distilled water (2 mL) and chloroform (2 mL), resulting in the separation of the organic phase containing the alkyl amine-stabilized Pd nanostructures and aqueous phase. The black organic phase was isolated, diluted with 10 mL of absolute ethanol, and centrifuged for 10 min at 8000 rpm, thereby resulting in the precipitation of a black solid. The black solid was subsequently washed several times with ethanol and allowed to dry in air.

Example 2

The prepared tetrahedral palladium (TH Pd) nanocrystals were cast on a glassy carbon electrode for electrochemical measurements. As illustrated in FIG. 1, the surface of the surfactant-covered, untreated TH Pd was first examined by cycling in an Ar-saturated 0.1 M HClO$_4$ solution at a sweep rate of 20 mV/s from 0.06 to 1.1 V (vs RHE). The surfactant-covered TH Pd nanocrystals exhibited an almost featureless response within the studied potential window.

Example 3

Figure 3:
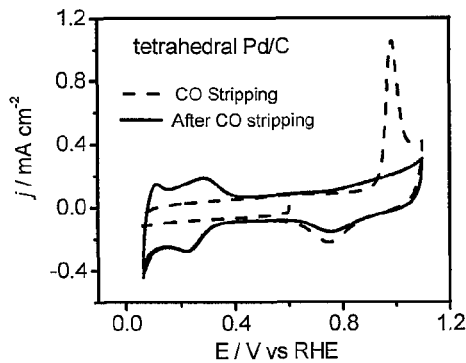
FIG. 3 is a plot that shows the voltammetry curve for the Pd tetrahedra covered by CO and the curve for the oxidative CO stripping in 0.1 M $HClO_4$ at a sweep rate of 20 mV/s.
Figure 4:
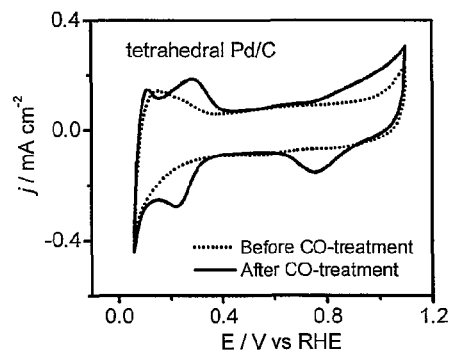
FIG. 4 is a plot showing the voltammetry curve of the Pd tetrahedra before and after CO treatment, obtained in 0.1 M $HClO_4$, at a sweep rate 20 mV/s.

The residual surfactant was removed from the surface of the prepared Pd catalyst by displacement of the surface ligand with CO followed by CO stripping. Adsorption of CO was achieved by immersing the electrode in a CO-saturated 0.1 M HClO$_4$ solution under a CO blanket for 30 min. The electrode was transferred to a fresh electrolyte, and the adsorbed CO was subsequently stripped from the surface by a potential sweep, running from 0 V up to 1.1 V at 20 mV/s. As depicted in FIG. 3, before reaching the CO stripping potential, no feature of hydrogen adsorption/desorption was observed; indicating the formation of a CO-covered surface. Upon further sweeping the potential to 1.1 V (dashed line), the feature corresponding to the electrochemical oxidation of CO(CO-stripping) was observed. The successive cyclic scanning (solid line) produced the voltammogram exhibiting the full features of CO on a clean Pd surface, indicating the removal of surfactants. The cyclic voltammogram on surfactant-covered and surfactant-free TH Pd surfaces was conducted in an Ar-saturated 0.1 M HClO$_4$ solution at a sweep rate of 20 mV/s as shown in FIG. 4.

Example 4

The synthesis of the Pd nanowires was repeated by utilizing a surfactant-based method described in Example 1 where the reduction of Pd$^{2+}$ was directed by the surfactant, ocatadecylamine (ODA). The crystallinity and purity of the prepared nanowires was verified using X-ray powder diffraction (XRD). The X-ray diffraction was performed on a Scintag diffractometer, operating in the Bragg-Brentano configuration using Cu Kα radiation (λ=1.54 Å) at a scan rate of 0.2° in 2θ per minute. Powder diffraction samples were prepared by rendering the dried powders into slurries in ethanol after sonication for several minutes. The slurries were then air-dried onto glass slides.

The morphology of the catalyst composites was characterized initially with low magnification transmission electron microscopy (TEM) images taken at an accelerating voltage of 80 kV on a FEI Tecnai 12 BioTwinG$^2$ instrument, equipped with an AMT XR-60 CCD Digital Camera System. High-resolution TEM (HRTEM) images and selected area electron diffraction (SAED) patterns were obtained on a JEOL 2010F instrument, equipped with a Gatan high-angle annular dark field detector (HAADF) for performing either incoherent HAADF or Z-contrast imaging in scanning TEM mode at accelerating voltages of 200 kV. Specimens for each of these TEM experiments were prepared by diluting the catalyst ink with ethanol, sonicating for 2 min in order to ensure adequate dispersion of the nanostructures, and evaporating one drop of the solution onto a 300 mesh Cu grid, coated with a lacey carbon film. Scanning electron microscopy (SEM) images were obtained by utilizing a field emission scanning electron microscope (Hitachi S-4800), operating at an accelerating voltage of 15 kV. SEM samples were prepared by dispersing in ethanol and sonicating for several minutes, followed by drop-casting onto a silicon wafer.

Figure 5:
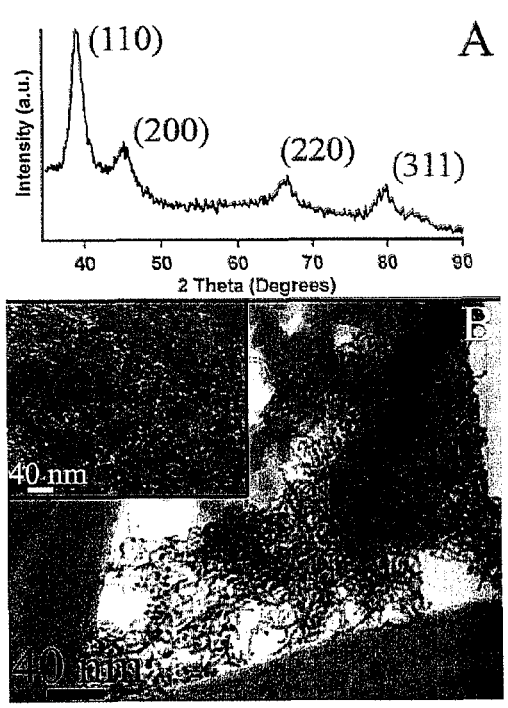
FIG. 5A is a representative X-ray powder diffraction pattern of unsupported nanowires.
FIG. 5B is a high resolution TEM image of unsupported nanowires. The inset image shows an SEM of the unsupported nanowires.
Figure 6:
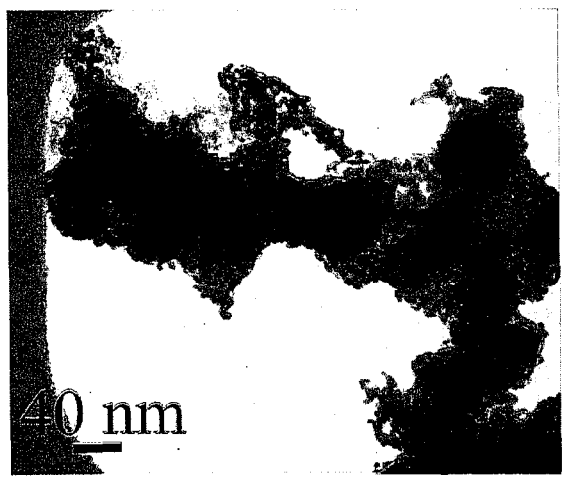
FIG. 6 is a representative TEM image of the nanowire agglomerates after washing the unsupported nanowires with chloroform.

The crystallographic analysis of a representative X-ray powder diffraction pattern (see FIG. 5A) revealed that all of the peaks could be readily attributed to the (111), (200), (220), and (311) reflections of face-centered cubic palladium (Fm3m, JCPDS no. 46-1043). There were no detectable crystalline impurities observed in the XRD pattern. The morphology of the prepared Pd nanowires (NWs) was initially characterized by electron microscopy. The TEM image presented in FIG. 5B reveals that the nanowires maintain ultrathin diameters of 2.0±0.5 nm with average lengths in excess of 100 nm. High resolution SEM images (inset to FIG. 5B) confirm the inherent quality and dimensions of the Pd NWs. However, there was still a substantial undesirable surfactant residue present, despite multiple washes with ethanol. Since the ODA surfactant is high soluble in chloroform, the nanowires were washed multiple times in chloroform in order to remove the residual surfactant. However, as illustrated in FIG. 6, the chloroform-washed nanowires became heavily agglomerated and their morphology was lost. Similarly, rapid agglomeration was observed after washing with other solvents, including dimethylformamide (DMF) and toluene.

Example 5

The nanowires of Example 4 were immobilized onto a conductive carbon support in order to prevent rapid agglomeration upon removal of the surfactant. Adsorption onto commercial carbon was achieved by a brief period of sonication with both components mutually dispersed in chloroform followed by centrifugation. Subsequently, the precipitated composites were dispersed into hexanes overnight in order to remove excess surfactant and affix the nanowires onto the carbon surface.

When the hexane washing was omitted and the solid was dispersed into ethanol, the isolated product was found by TEM to contain agglomerates of Pd NWs and bare carbon. By contrast, the Pd NW/C composites isolated after immersion in hexanes for 24 h could be redispersed in a broad range of solvents with sonication without any apparent desorption or aggregation of the nanowires. This effect is attributed to the rapid solubilization of excess ODA during the hexane washes. Upon the basis of the agglomeration of the unsupported nanowires when immersed in hexanes, it is believed that the hexane wash contributes to a partial desorption of the ODA from the Pd NW surface, resulting in aggregation.

Example 6

Figure 7:
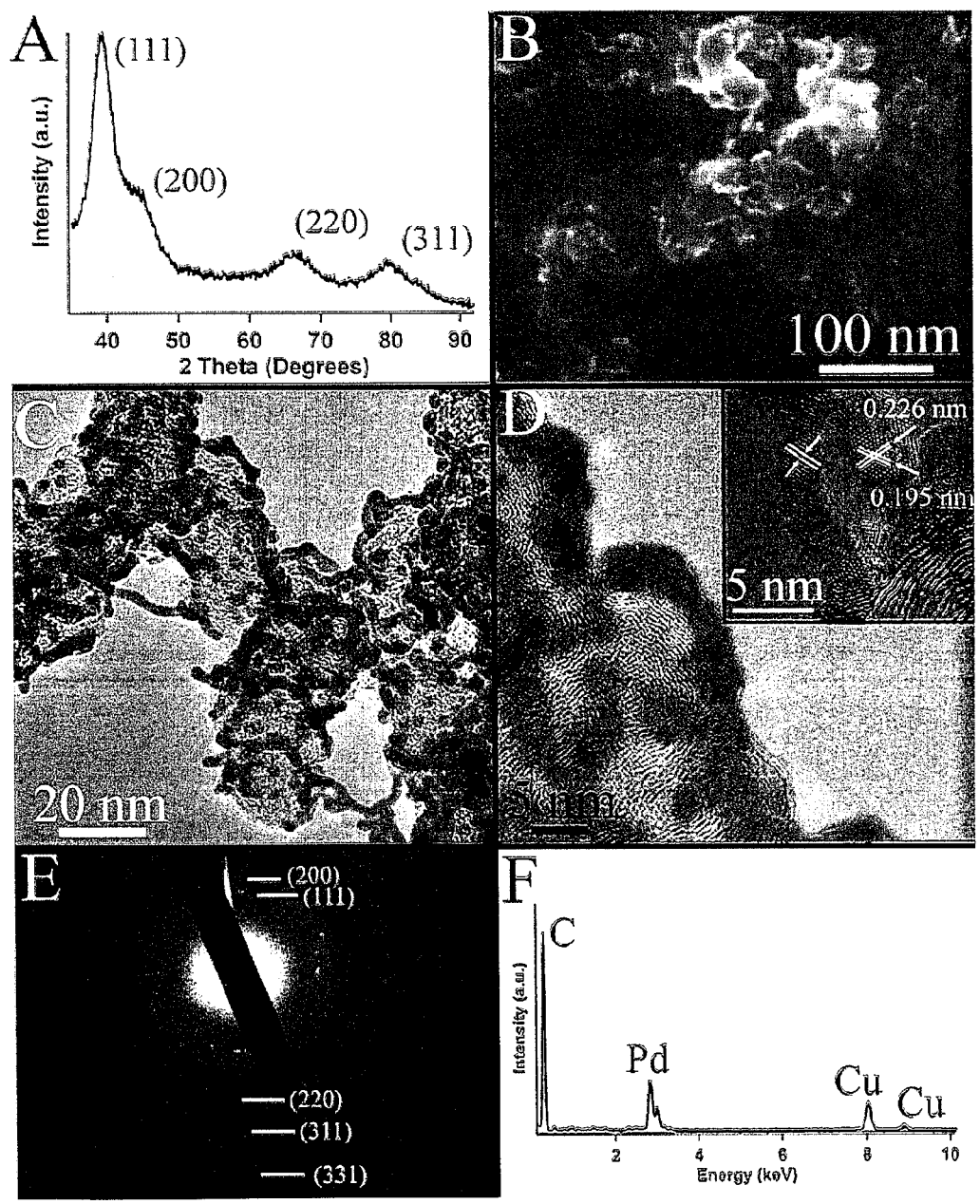
FIG. 7A is a representative experimental powder XRD pattern of the Pd nanowire/carbon (NW/C) composites.
FIG. 7B is a FESEM image of the Pd NW/C composite.
FIG. 7C is the low resolution TEM image of the Pd NW/C composite.
FIG. 7D is a high-resolution TEM image of palladium nanowires. Inset shows a high resolution TEM image of a single palladium nanowire.
FIGS. 7E-7F are images that illustrate the associated area of electron diffraction (E) and energy dispersive X-ray spectroscopy (F) of the Pd NW/C composites.

The structure and crystallinity of the Pd NW/C composites were studied by XRD and electron microscopy. The XRD pattern shown in FIG. 7A of the Pd NW/C revealed that the adsorption process had no effect upon the purity and crystallinity of the sample, because all of the peaks could be readily indexed to the (111), (200), (220), and (311) reflections of the face-centered cubic palladium phase. FIG. 7C is an overview TEM image of the composites showing that the nanowires largely maintain their wire-like morphology, as well as their dimensionality, e.g., their ultrathin diameter of approximately 2 nm (2.2±0.5 nm). However, a small percentage (~5%) of nanoparticles was apparent. The supported wires possessed measurably smaller lengths as compared with the prepared nanowires, with lengths estimated to be only up to 30 nm. Indeed, FESEM (FIG. 7B) images further confirmed the presence of Pd NWs adsorbed onto the carbon surface and also revealed that a uniform distribution of catalyst could be achieved. The presence of nanoparticles and the observed decrease in nanostructured length can be attributed to the effect of the mechanical stress associated with sonication of the nanowires in the presence of the carbon support. As illustrated in FIG. 7D, according to the high resolution TEM (HRTEM), the nanowires are polycrystalline and are composed of multiple single crystalline segments with lengths of 6±1 nm, that extend along the axis of the nanowire. Not surprisingly, the single crystalline segments making up the nanowires possess lattice spacings of 0.226 and 0.195 nm, consistent with (111) and (200) lattice spacings, respectively. The selected area electron diffraction (SAED) pattern shown in FIG. 7E highlights the presence of not only continuous rings that can be indexed to palladium's (111), (200), (220), (311), and (331) planes, respectively, but also discrete diffraction spots, indicating that the high degree of crystalline substructure observed is representative of number of nanowires that contributed to the observed diffraction pattern. The composition of individual nanowires was investigated using energy dispersive X-ray spectroscopy (FIG. 7F) in scanning TEM mode with an electron beam size of 0.2 nm and highlights only the elemental presence of Pd and C, with the Cu peaks emanating from the TEM grid.

Example 7

The electrochemical performance and surface contamination of the prepared Pd NW/C composites were initially studied by cyclic voltammetry in order to determine if residual organic residues were present on the surface of the nanowires. Specifically, cyclic voltammograms obtained in 0.1 M $HClO_4$ solution (see FIG. 8) revealed that the surface of the Pd NWs was entirely passivated by residual surfactant, despite the ethanol and hexane washes. By comparison with commercial carbon-supported Pd nanoparticles, the Pd NW/C composites showed an almost complete suppression of the hydrogen adsorption ($H_{ads}$) peaks in the region of 0-0.35 V and a delay in the formation of the oxide region to almost 0.9 V, thereby confirming that the active surface sites were not readily accessible to the electrolyte.

Example 8

Figure 9:
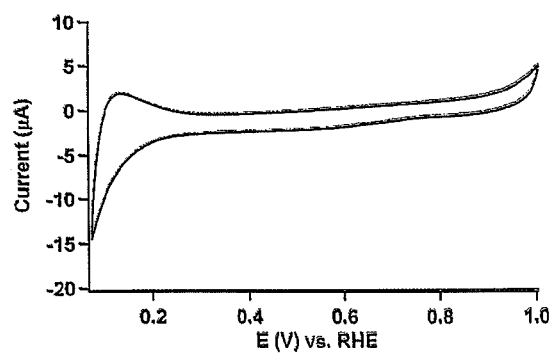
FIG. 9 is a plot of a cyclic voltammogram obtained in 0.1 M $HClO_4$ at 20 mV/s after selective CO adsorption and CO stripping of the Pd NW/C composites without treatment.

The prepared Pd NW/C composites were supported onto a GCE and selective adsorption of CO was attempted in a CO saturated 0.1 M $HClO_4$ solution under reducing potentials. However, the cyclic voltammogram (see FIG. 9) remained unchanged despite more than 2 h of immersion in the CO saturated solution. The absence of any change in the cyclic voltammogram was an indication that the residual ODA on the surface sufficiently blocked the adsorption of CO. In this case, the strong adsorption of the amine functional group to the surface of Pd and the inherent hydrophobicity of the alkyl chain present in ODA prevent effective adsorption of CO from the solution. It is believed that the strong interaction between the terminal amine functionality and the Pd surface in combination with the strongly hydrophobic end groups of the adsorbed surfactant (i) blocks the active Pd surface sites and (ii) prevents effective transport of reactants onto the surface of Pd.

Example 9

The protocol described in Example 3 was modified by additionally activating the prepared catalysts by either (1) acid washing, or (2) time-controlled UV-ozone treatment prior to the removal of the residual surfactant by CO displacement. Desorption of the coordinated organic molecules is accomplished by first weakening the interaction of the surfactant to the surface either by acid or ozone treatment.

(1) Acid Wash

The prepared catalyst powder was dried and dispersed in 5 mL of glacial acetic acid by bath sonication for 30 min within a fume hood. The mixture was then brought to 50° C. for 1 h, the mixture was centrifuged while still hot, and the acetic acid was later decanted. The treated composites were then washed several times with ethanol and allowed to dry overnight. After treatment, a catalyst ink was prepared by adding an appropriate amount of 25% isopropyl alcohol (IPA) solution to the dry powder to provide a 2 mg/mL concentration. The catalyst powder was dispersed into the ink by sonication for 45 min to achieve a uniform distribution.

(2) Time-Controlled UV-Ozone Treatment

The prepared catalyst powder was dried and dispersed into ethanol by sonication after which several drops were placed onto a silicon wafer. The wafers were placed into a LTV-ozone generator (UVOCS model no. T10×10-OES) and treated for 15 min. The treated nanowires were then isolated from the wafers by sonication into a 25% IPA solution, thereby ultimately yielding the final catalyst ink solution of approximately 1 mg/mL.

Example 10

The weakening of the surfactant on the surface of the catalyst either by acid or ozone treatment is followed by the preferential adsorption of a CO monolayer, which strongly coordinates to the surface of noble metals under slightly reducing potentials and displaces undesirable organic residues. Subsequently, the pristine surfaces of the catalyst can be readily exposed by electrochemical oxidation of the CO monolayer (CO stripping).

Specifically, residual surfactant was removed from the surface of the treated Pd catalyst by displacement of surface ligands with CO followed by CO stripping. Adsorption of CO was achieved by immersing the electrode in a CO-saturated 0.1 M $HClO_4$ solution under a CO blanket for 30 min. The electrode was transferred to a fresh electrolyte, and the adsorbed CO was subsequently stripped from the surface by a potential sweep, running up to 1.1 V at 20 mV/s. A monolayer of Cu was then deposited by Cu UPD from a deoxygenated solution of 50 mM $CuSO_4$, maintained in a 0.10 M $H_2SO_4$ electrolyte. The Cu monolayer modified electrode was transferred to and immersed in a solution of a 1.0 mM $K_2PtCl_4$ solution in 50 mM $H_2SO_4$ for 2 to 5 minutes. All of these steps were performed in a two chamber electrochemical apparatus, which allows for the transfer of the Cu monolayer modified electrode under an inert Ar atmosphere, which protects the Cu adatoms from oxidation. The modified Pt monolayer electrode was removed from the electrochemical apparatus (cell) and rinsed thoroughly, before being covered by a 5 μL drop of Nafion solution (0.025% in ethanol), which had been prepared from an initial 5% stock solution (Aldrich).

Example 11

Figure 10:
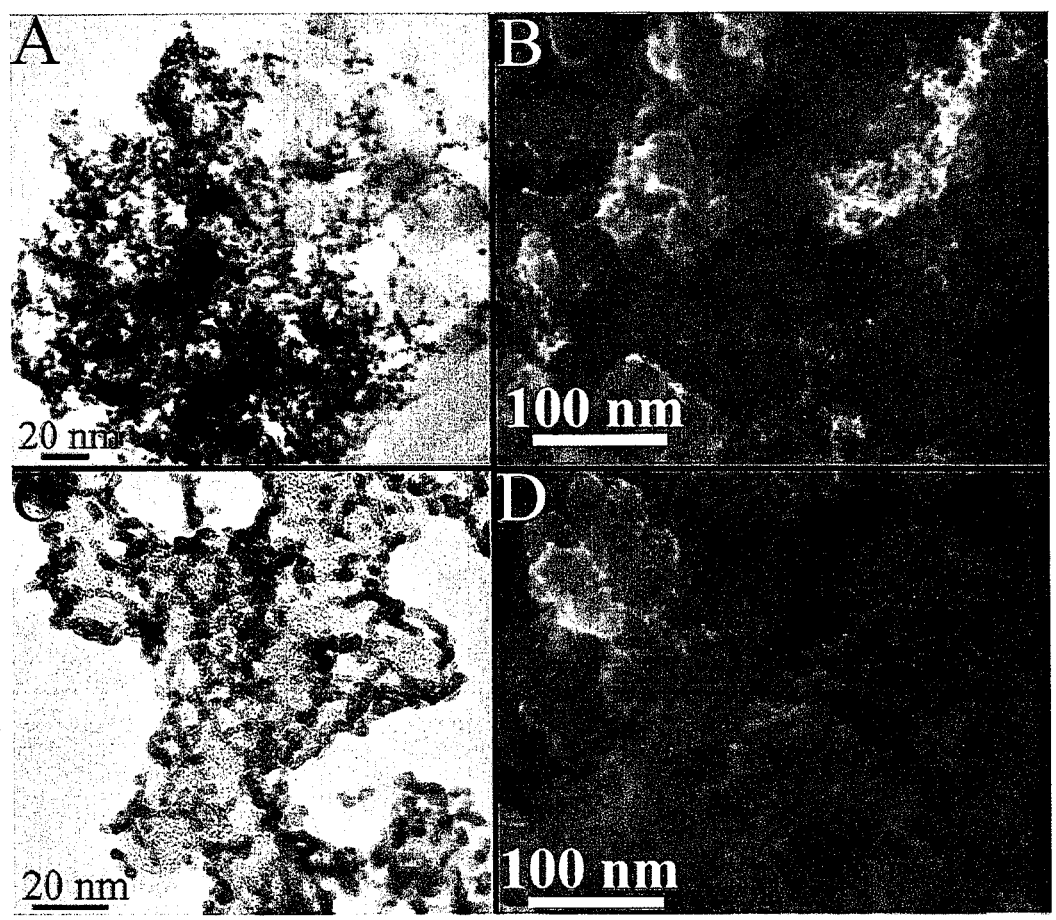
FIGS. 10A-10D are representative TEM (A and C) and SEM (B and D) images of supported Pd NW/C composites after treatment in acid (A and B) and UV-generated ozone (C and D), respectively.

Overview TEM and SEM images of the acid treated Pd NW/C are shown in FIG. 10A and FIG. 10B, respectively. Treated Pd nanowires possess a largely one-dimensional morphology and maintain an ultrathin diameter of 2.3±0.5 nm. However, it is apparent from both TEM and SEM images that the acid treatment results in significant aggregation of the nanowires into net-like bundles and that there was also a noteworthy increase in the fraction of nanoparticles present, to approximately 10-15%.

Interestingly, cyclic voltammetry of the acid-treated Pd NW/C obtained after selective CO adsorption followed by CO stripping (FIG. 8) displayed both characteristic $H_{ads}$ peaks in the region of 0 to 0.2 V and the onset of oxide formation at ~0.7 V. The strong similarity between the voltammetric response of the acid treated Pd NW/C composites and that of commercial carbon supported Pd nanoparticles confirmed that the surfactant had been successfully removed from the surface. It is believed that the suppression of the ODA-Pd interaction by the acid treatment contributes to an enhancement in the selective adsorption of CO and the inevitable displacement of the surfactant.

Example 12

The second treatment involves the time-controlled exposure of the Pd NW/C composites to UV-generated ozone. A short 15 min UV-ozone treatment was utilized in order to weaken the interaction between the residual ODA and the surface Pd, thereby allowing for effective removal of the ODA by selective CO adsorption. Representative overview TEM and SEM images of the Pd NW/C composites after UV-ozone treatment are shown in FIG. 10C and FIG. 10D, respectively. By comparison with the electron microscopy data of the untreated samples, the ozone treatment does not contribute to any significant change in either the morphology or distribution of the Pd NW/C. The TEM images show that the ozone-treated nanowires largely retain the desirable one-dimensional, wire-like morphology. However, there was some fragmentation of the nanowires resulting in the presence of short wire fragments, as well as some nanoparticles. Nevertheless, the SEM images of ozone-treated nanowires, which show a broader perspective, confirm the presence of a majority of long nanowires and nanowire fragments with some nanoparticles present. There is no significant change in the reported ultrathin diameter of 2.2±0.8 nm of the nanowires.

By contrast with the acid-treated samples, the ozone-treated samples maintain a high degree of dispersion on the carbon substrate with no appreciable aggregation. Overview SEM images, which provide a more representative view of a thin catalyst layer, highlight the presence of longer nanowires with lengths in excess of 100 nm that are apparent on larger carbon aggregates and short wire-like fragments with average lengths of 26±11 nm.

After ozone treatment, the Pd NW/C composites were deposited onto a GCE, and selective CO adsorption was performed in order to remove the residual surfactant. After CO stripping, cyclic voltammograms (see FIG. 8) of the Pd NW/C composites showed $H_{ads}$ and oxide formation features that were in agreement with the commercial Pd NPs, thereby confirming that the surfactant was removed. More importantly, the $H_{ads}$ profile of the ozone-treated composites is in agreement with that of the acid-treated composites, which clearly demonstrates that both methods are equally effective at removing the residual surfactant.

Example 13

An aspect of these treatment protocols is that the single crystalline segments are maintained despite some fragmentation and aggregation. These single crystalline segments represent the main structural unit of the nanowires because they are expected to possess the most electro-catalytically active surface sites for ORR. To further explore the importance of the disclosed techniques in maintaining the desired one-dimensional morphology, two protocols were examined that are commonly meant to remove organic residues from nanoparticulate catalysts and described in Mazumder et al. (*Adv. Funct. Mater.* 2010, 20, 1224-1231). Specifically, thermogravimetric analysis (TGA) was used to rationally design a heat treatment protocol so as to thermally desorb the ODA from the Pd surface. Thermogravimetric analysis was performed on a TGA Q500 (TA Instruments). Isotherms were obtained by raising the temperature from 25 to 900° C. at a rate of 10° C./min under a flow of ultra-dry high purity air, provided at a rate of 60 mL/min. The mass profiles reveal that the decomposition of the carbon is initiated at ~300° C. and is complete by 600° C. After all carbonaceous material has been removed, the amount (wt %) of palladium was obtained at or above 800° C. The palladium loading was found to be 29.6% for the untreated sample, and it increased slightly to 31.4% and 36.9% after ozone and acid treatment, respectively. The slight increase in the palladium weight percent can be attributed to loss of residual surfactant and carbon after treatment. The palladium mass loading was also independently verified by performing TGA analysis on 30 μL of the catalyst ink used in the electrochemical experiments and dried directly in the platinum pan. The TGA isotherms show that the Pd NW/C powder was heated to 250° C. in air or in nitrogen for 1.5 h within a muffle furnace in order to completely remove the undesired organic residue. The heat-treated powder was then dispersed in ethanol for the purposes of electron microscopy. Alternatively, cyclic voltammetry was utilized with the potential cycled to ~1.65 V vs RHE, so as to selectively oxidize the amine functional groups of the ODA and thereby expose the catalyst surface.

Figure 11:
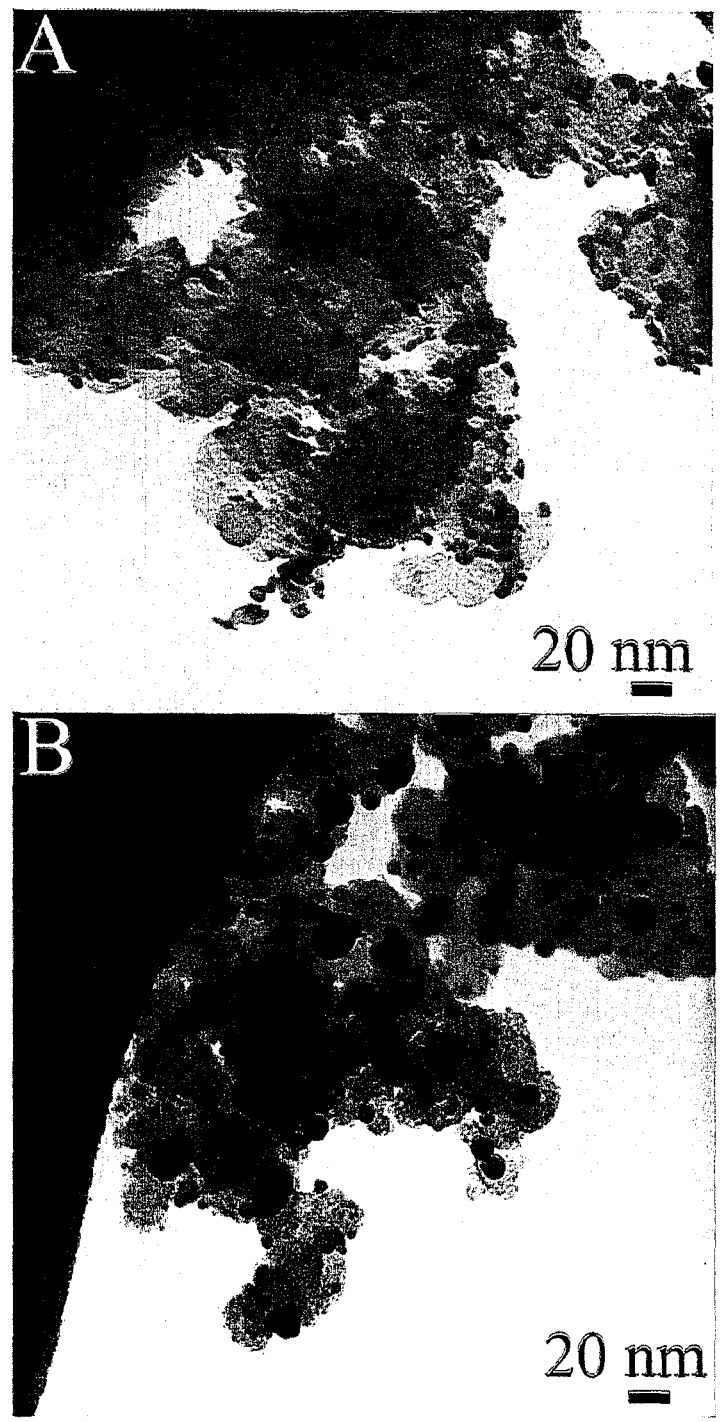
FIGS. 11A-11B are representative TEM images of the Pd nanowires after treatment with high potential cycling (A) and high temperature annealing (B).

However, representative TEM images of the products isolated after these two traditional treatment protocols (see FIG. 11) showed complete conversion of the nanowires to nanoparticle aggregates. Hence, effective protocols conventionally utilized for the activation of nanoparticulate catalysts cannot be blindly applied to 1D catalysts with the expectation of a conservation of morphology. More importantly, these methodologies highlight the versatility of selective CO adsorption, in which undesirable organic residues can be removed without the need for harsh reaction conditions that can be structurally detrimental to nanostructures with 1D morphologies and their correspondingly small diameters.

Example 14

Figure 12:
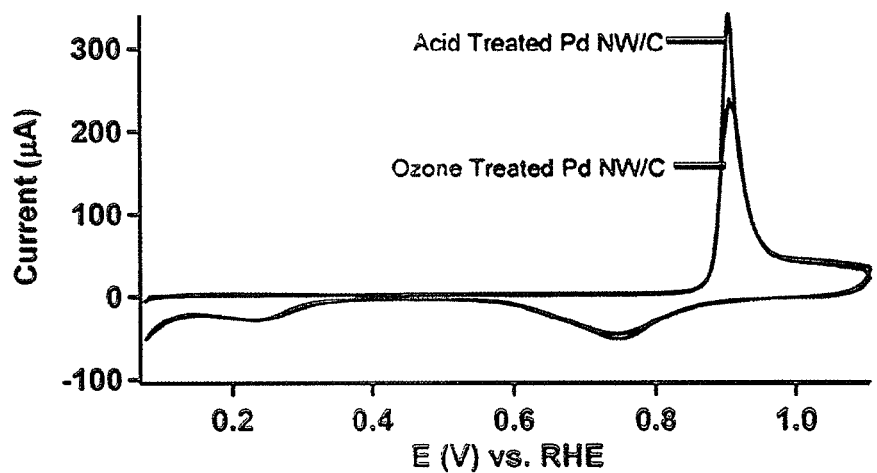
FIG. 12 is a plot showing the CO stripping voltammograms of the acid and ozone-treated Pd NW/C composites obtained in a 0.1 M $HClO_4$ solution at 20 mV/s after a period of 30 minutes of immersion in a CO-saturated 0.1 M $HClO_4$ electrolyte.
Figure 13:
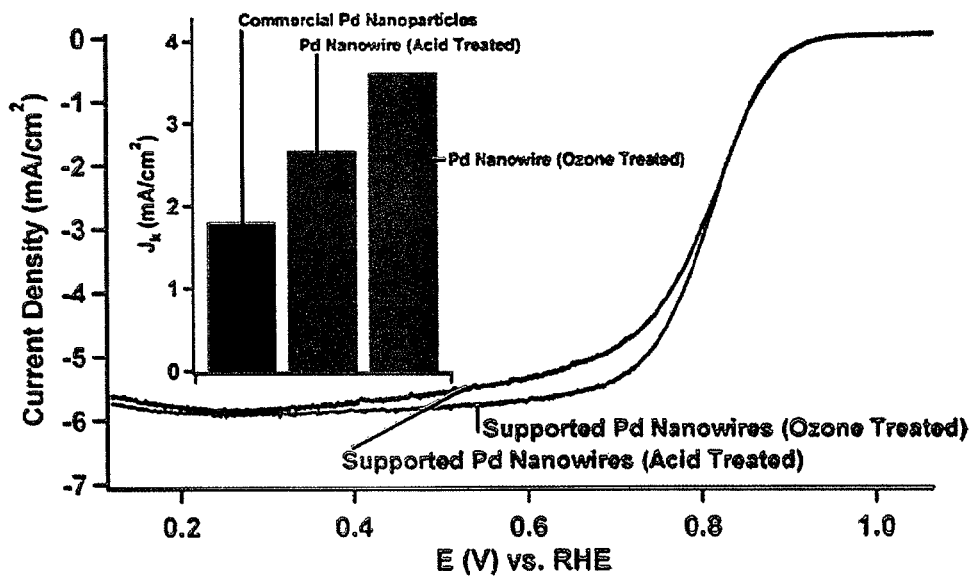
FIG. 13 is a plot showing polarization curves for treated Pd nanowire samples immobilized onto a glassy carbon rotating disk electrode. The curves (anodic sweep direction) were obtained with a rotation rate of 1600 rpm in a 0.1 M $HClO_4$ solution at 20° C. The inset shows the electrochemical surface area activities at 0.8 V for variously treated Pd nanowire samples in comparison to commercial supported Pd nanoparticles.

The electrochemical surface area (ESA) of nanowire and commercial nanoparticle catalysts was determined by integration of the CO stripping peak as shown in FIG. 12. The CO stripping charge in the case of the Pd nanostructures was utilized because the $H_{ads}$ profile is unreliable as a result of substantial hydrogen absorption. Subsequently, the ORR activity for the treated Pd NW samples was measured electrochemically by obtaining polarization curves in an oxygen-saturated 0.1 M $HClO_4$ solution as shown in FIG. 13. The nanowire samples show an ORR onset between 0.85 and 0.9 V, which is consistent with that of nanostructured Pd catalysts. As illustrated in the inset to FIG. 13, the measured kinetic currents at 0.8 V were normalized to the ESA to probe the intrinsic activity of the catalysts. In this case, the kinetic current was measured at 0.8 V, because the Pd-based catalysts show almost no activity at 0.9 V. On the basis of this protocol, the ozone-treated nanowires displayed an electrochemical surface area activity (ECSA) of 3.62 $mA/cm^2$, which was approximately 1.4 fold higher as compared with that of acid treated nanowires (2.67 mA/cm2). The higher activity in the ozone-treated nanowires is attributed to the uniquely advantageous nature of the ozone treatment.

From a structural perspective, the main structural unit of these nanowires consists of the elongated single crystalline segments that compose the wires. Although both treatment protocols preserve these elongated single crystalline segments, the primary difference is that the ozone-treated nanowires maintained (i) an improved dispersion of the wires on carbon, (ii) less aggregation of the nanowires during processing, and (iii) the formation of fewer nanoparticles, as compared with the acid-treated nanowires. As expected, the structure of the polarization curve in the mixed control region indicates that the ozone-treated nanowires maintain an improved dispersion on carbon and have reduced amount of aggregation compared to the untreated nanowires.

As previously shown in Koenigsmann (2010), highly dispersed ultrathin nanowires, possessing certain pristine, defect-free surfaces, are significantly more active toward ORR, as compared with analogous aggregated nanowires. Interestingly, this observed difference in the kinetic current at 0.8 V highlights the role of treatment protocols. In fact, there is a clear correlation between structure and the resulting activity of the as generated catalysts.

Example 15

In addition to observing a treatment-dependent ORR activity, the nanowires also showed a distinctive structure-dependent enhancement, when the catalytic activity of the generated nanowires was compared with that of commercial Pd nanoparticles. Specifically, the ozone-treated Pd NW/C samples showed 2 fold increase in activity compared commercial Pd NP/C composites (1.8 $mA/cm^2$). The acid-treated Pd NW/C samples also showed increase in activity, albeit smaller. The acid-treated Pd NW/C samples showed 1.5 fold increase in activity, compared to commercial Pd NP/C composites (1.8 $mA/cm^2$).

The 1D nanostructures displayed significantly enhanced activities, which can be attributed in part to their uniquely advantageous anisotropic structure. In particular, 1D nanostructures preferentially display smooth, low energy crystal facets, which maintain fewer defect sites as compared with analogous nanoparticulate catalysts. Previously, ultrathin Pt nanowires were prepared within basic media, which maintained relatively few defect sites. These possessed low energy crystalline facets and a corresponding <111> growth direction, based on CV and HRTEM results. These ultrathin Pt nanowires demonstrated significantly enhanced activities as a result of their uniquely advantageous surface structure. It has been previously observed that the use of basic amine-terminated surfactants results in the preferential growth along the <111> crystallographic direction as a result of selective adsorption to the (100) facets. (Teng, X. et al *Nano Lett.* 2005, 5, 885-891). Thus, the use of octadecylamine (a basic surfactant) results in preferential growth along the <111> direction as shown in FIG. 7D. The preferential growth along the <111> direction suggests the presence of low energy facets.

Example 16

Figure 8:
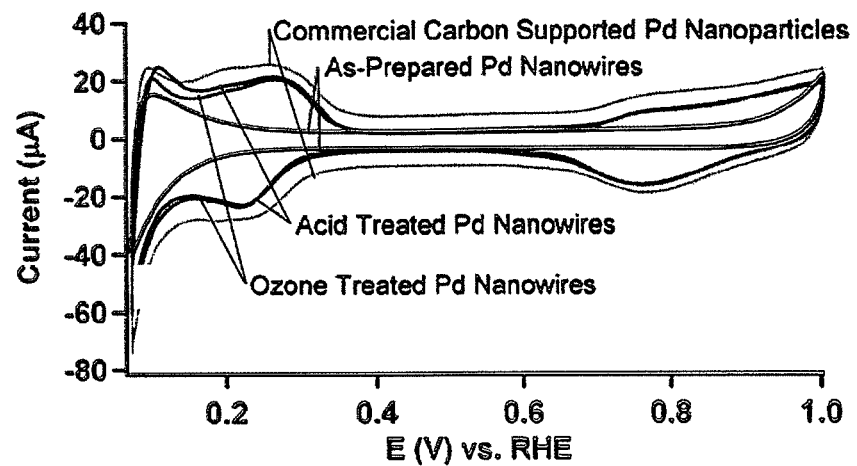
FIG. 8 is a plot of cyclic voltammograms obtained for the carbon-supported ozonized and acid-treated nanowires after selective CO adsorption and CO stripping shown in comparison to a Pd nanowire sample and a commercial carbon-supported Pd. The samples were loaded separately onto a GCE in a deoxygenated 0.1 M $HClO_4$ solution at 20 mV/s.

The $H_{ads}$ profile of the Pd NW/C composites shown in FIG. 8 is unique when compared with that of the Pd NP/C catalyst. Specifically, the CV of the Pd NP/C displays two broad peaks centered at approximately 0.27 and 0.20 V in the anodic sweep segment, respectively, whereas the Pd NW/C CV shows only a single peak centered at 0.27 V with a corresponding shoulder at 0.20 V. The presence of fewer peaks in the $H_{ads}$ region may suggest a more uniform surface. Hence, without being bound by theory, it is believed that the Pd NW/C nanostructures possess more uniform defect free surfaces resulting in a suppression of the cathodic overpotential and a corresponding increase in the ORR activity.

Example 17

The deposition of the platinum monolayer shell was accomplished utilizing a method described in Zhang et al. (*J. Phys. Chem. B* 2004, 108, 10955-10964, incorporated herein by reference) and Brankovic et al. (*Surf. Sci.* 2001, 474, L173-L179, incorporated herein by reference) Briefly, a 5 µL drop of the appropriate catalyst ink was placed onto a polished glassy carbon electrode (GCE) (RDE, Pine Instruments, 5 mm active area) and allowed to air-dry, thereby forming a uniform catalyst layer. For all electrochemical measurements, a reference electrode (Ag/AgCl, 3 M Cl⁻) was used with a double junction chamber (Cypress) and platinum foil served as the counter electrode. All of the potentials are given with respect to a reversible hydrogen electrode (RHE), unless otherwise stated.

Figure 14:
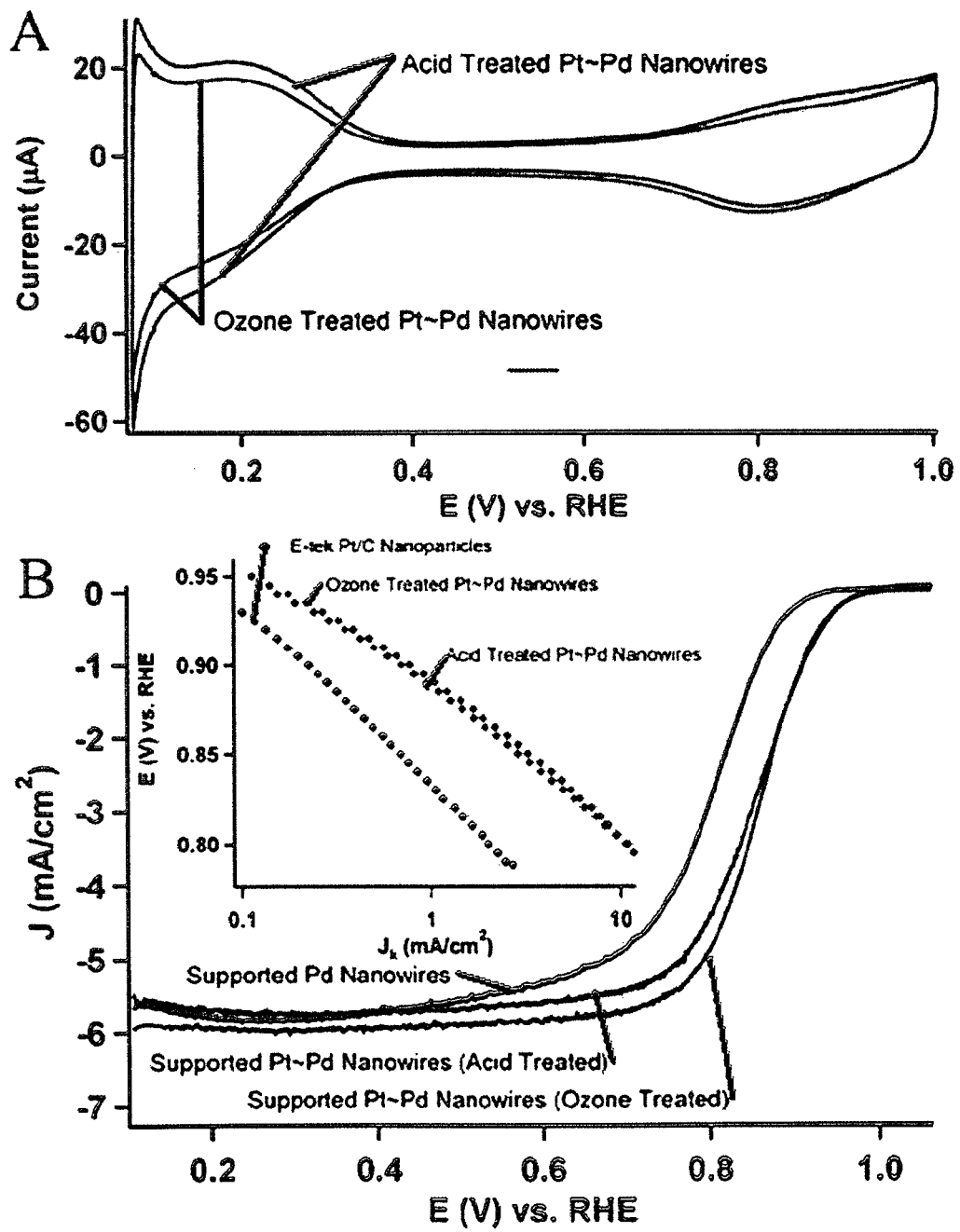
FIG. 14A is a plot showing cyclic voltammograms obtained for the ozone and acid treated Pt—Pd NW/C core-shell nanowires, after Pt monolayer deposition, loaded separately onto a GCE in a 0.1 M $HClO_4$ solution at 20 mV/s.
FIG. 14B is a plot showing the polarization curves for the treated Pt—Pd/C core-shell nanowire composites that were obtained on a glassy carbon rotating disk electrode. The curves (anodic sweep direction) were collected using a rotation rate of 1600 rpm in a 0.1 M $HClO_4$ solution at 20° C. The inset shows the kinetic current vs. potential plots of treated Pt—Pd/C composites and commercial carbon supported Pt nanoparticles.

Cyclic voltammetry of the resulting Pt monolayer shellPd NW/C core (Pt—Pd NW/C) (see FIG. 14) showed (i) a $H_{ads}$ region that resembled that of the platinum (111) surface and (ii) a delay in the oxidation and the reduction of the surface to higher potentials, when compared with the Pd NW/C composite. These results are in agreement with those from previous reports of platinum monolayers deposited onto Pd single crystals (Zhang, J., et al. *Angew. Chem., Int. Ed.* 2005, 44, 2132-213527) and, more importantly, elemental (Zhang, J., et al. *J. Phys. Chem. B* 2004, 108, 10955-10964) and alloyed (Zhang, J. et al. *J. Phys. Chem. B* 2005, 109, 22701-22704) palladium nanoparticles.

According to Zhang, J. et al. (*J. Phys. Chem. B* 2004, 108, 10955-10964), the surface of Pt monolayer deposition on Pd (111) single crystals is found to be composed of interconnected Pt islands with some regions of bare Pd surface exposed. The Cu UPD charge is in agreement with the $H_{ads}$ charge obtained after monolayer deposition, confirming the near monolayer deposition of Pt.

Example 18

Studies of the kinetics of ORR on both 1-D nanowire and commercial nanoparticle catalysts have been performed using the thin-layer rotating disk electrode (RDE) method. (Garsany, Y. et al. *Anal. Chem.* 2010, 82, 6321-6328). Specifically, cyclic voltammetry was performed in a deoxygenated 0.1 M $HClO_4$ solution with a scan rate of 20 mV/s. Polarization curves were obtained in $O_2$-saturated 0.1 M $HClO_4$ solutions at 20° C. with a scan rate of 10 mV/s and a rotation rate of 1600 rpm. The ORR activity of the prepared activated Pd NW/C and Pt monolayer Pd NW/C catalysts was compared with that of commercial Pd and Pt nanoparticles, respectively, adsorbed onto Vulcan XC-72 carbon (20% by weight of total Pt metal, E-tek) and rendered into 2 mg/mL catalyst inks in 25% IPA. The durability testing of both the prepared and commercial catalysts was performed under half-cell conditions in perchloric acid, utilizing a durability test protocol described by the U.S. DOE for simulating a catalyst lifetime under MEA conditions. (*Multi-Year Research, Development and Demonstration Plan: Planned Program Activities for* 2005_2015, Department of Energy, 2009) Specifically, the potential was cycled from 0.6 to 1.0 V in 0.1 M $HClO_4$ and left open to the atmosphere. The electrochemical surface area (ESA) was obtained after every 5000 cycles, and the electrochemical surface area activity was measured after every 10 000 cycles. For the durability tests, the durability of the nanowires was compared with high performance (HP) Pt nanoparticles adsorbed onto Vulcan XC-72 carbon (20% by weight of total Pt metal, E-tek).

Figure 15:
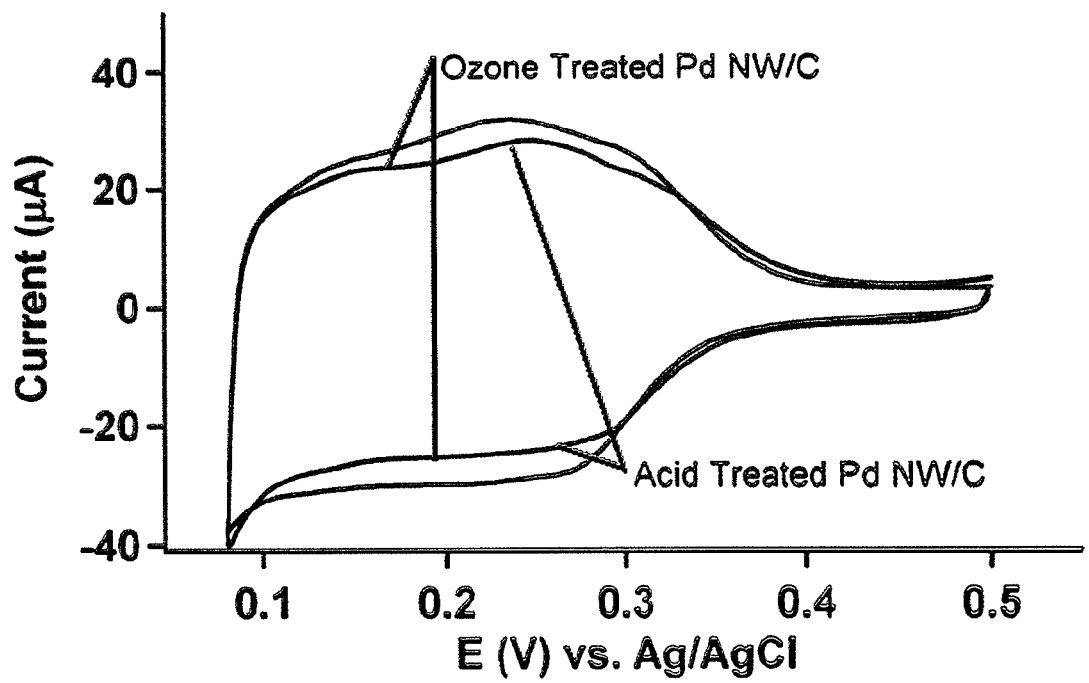
FIG. 15 is a plot showing cyclic voltammograms for the under-potential deposition of a Cu monolayer (Cu UPD) obtained for the treated nanowire composites in a 50 mM $CuSO_4$ solution with 50 mM $H_2SO_4$ supporting electrolyte.

The ORR activity of the Pt—Pd NW/C composites was measured electrochemically by obtaining polarization curves in oxygen-saturated 0.1 M $HClO_4$ (see FIG. 14B) solution. Both the acid- and ozone-treated nanowires displayed an ORR onset in the region of 0.9-1.0 V, which is consistent with that of nanostructured Pt catalysts. In addition, the core-shell nanowires composites displayed dramatically enhanced ORR activity as compared with the Pd NW/C catalyst before Cu UPD, which is shown in FIG. 14B. This observation further confirms the successful deposition of a platinum monolayer atop the Pd NW substrate. In order to probe the intrinsic activity of the core-shell nanowires, the measured kinetic currents at 0.9 V were normalized to the electrochemical surface areas, as determined from the hydrogen adsorption charge obtained from the composite structure. Similarly, the platinum mass activity was deduced by normalizing the measured kinetic current to the mass of Pt deposited, which can be readily extracted from the Cu UPD voltammograms (see FIG. 15).

Example 19

Figure 16:
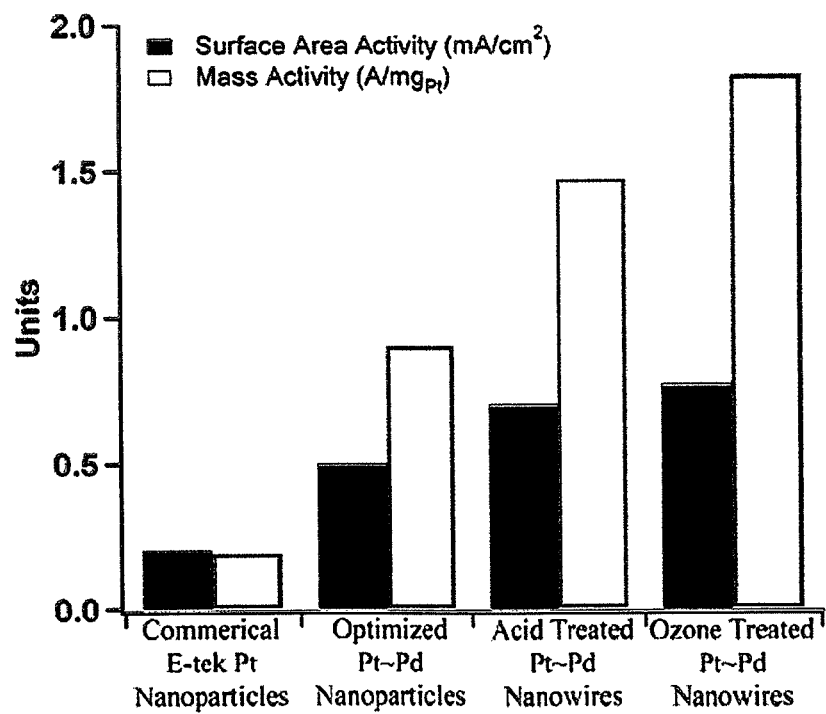
FIG. 16 is a histogram representing the electrochemical surface area activity (ECSA, $mA/cm^2$) and the mass activity (A/mg) at 0.9 V for the Pt—Pd nanowire samples shown by comparison with commercial carbon-supported Pt nanoparticles along with the reported values for optimized Pt—Pd nanoparticles.

The area- and mass-specific activities of the treated core-shell nanowires are summarized in FIG. 16 by comparison with commercial platinum nanoparticles and optimized Pt—Pd core shell nanoparticles prepared analogously (Wang, J. X.; et al. *J. Am. Chem. Soc.* 2009, 131, 17298-17302). The ozone-treated nanowires maintained outstanding area-specific and mass-specific activities of 0.77 mA/cm² and 1.83 A/mg$_{Pt}$, respectively. By comparison, the acid-treated nanowires also demonstrated high area- and mass-specific activities of 0.70 mA/cm² and 1.47 A/mg$_{Pt}$, which were noticeably lower in magnitude than the ozone-treated nanowires. The exceptional enhancement in the activity of the ozone-treated nanowires again highlights the dependence of the treatment method upon the inevitable activity of nanowire catalysts. The structure of the polarization curve in the mixed control region indicates that the ozone-treated nanowires maintain an improved dispersion on the carbon surface as well as less aggregation. This observation readily explains the significant difference in mass specific activity, which is dependent upon the dispersion of the catalyst and the degree of aggregation. By contrast, there is little difference in the area-specific activity, which is more closely related to the intrinsic active sites of the catalyst.

Example 20

To demonstrate the outstanding activity of the core-shell nanowires, a plot of the kinetic current vs. the potential (inset to FIG. 14B) shows that the core-shell nanowires maintain higher kinetic currents over the entire range of plausible operating potentials as compared with commercial Pt nanoparticles. Moreover, the ozone- and acid-treated core-shell nanowire systems display enhancements in area-specific activity of 1.54 and 1.40 fold, respectively, as well as enhancements in Pt mass-specific activity of 2.03 and 1.60 fold, respectively. Given that palladium is also considered to be a platinum group metal (PGM), the mass activity can also be reported with respect to the total PGM loading, as determined by TGA analysis. The PGM mass activity for the ozone-treated and acid-treated Pt—Pd NW/C samples were determined to be 0.55 A/mg and 0.32 A/mg, respectively. Both of these represent a true enhancement when compared with the PGM mass activity values of 0.25 A/mg and 0.19 A/mg obtained for the analogous optimized core-shell Pt—Pd and commercial Pt nanoparticles, respectively. It is believed that the respectively. It is believed that the enhancement in the activity of the described ultrathin nanowires are attributed to a reconstruction of the nanowire surface that increases the strain-induced contraction of the Pt monolayer. Several theoretical and experimental studies have shown that metallic nanowires composed of platinum group metals (e.g., Au, Pt, Ir) undergo a distinctive surface contraction, when their diameter is decreased below a critical value of approximately 2-4 nm (Haftel, M. I.; et al. *Phys. Rev. B: Condens. Matter* 2006, 74, 035420-035412; Diao, J.; et al. *Nat. Mater.* 2003, 2, 656-660; Kondo, Y.; Takayanagi, K. *Science* 2000, 289, 606-608.). A contraction of the core nanowire surface would inherently result in an enhancement in the strain induced compression of the Pt monolayer shell, thereby causing a decrease in OH adsorption and a corresponding increase in ORR kinetics. (Wang, J. X., 2009). The same effect has been achieved in Pd nanoparticles alloyed with certain third-row transition metals and recently in more elegant transition metal core-noble metal shell nanoparticles. In these nanoparticles, the surface of the Pd is contracted by the presence of transition metals with smaller atomic radii. However, the incorporation of less noble transition metals can lead to an inevitable increase in corrosion processes under operating conditions, which can compromise the durability of these nanostructures for long-term use in fuel cells. Thus, the advantageous properties of ultrathin nanowires can allow for the enhancement of Pt monolayer activity by increased strain-induced effects without the need for additional third row transition metal dopants and without potentially compromising the durability of the resulting core-shell composite.

Example 21

Figure 17:
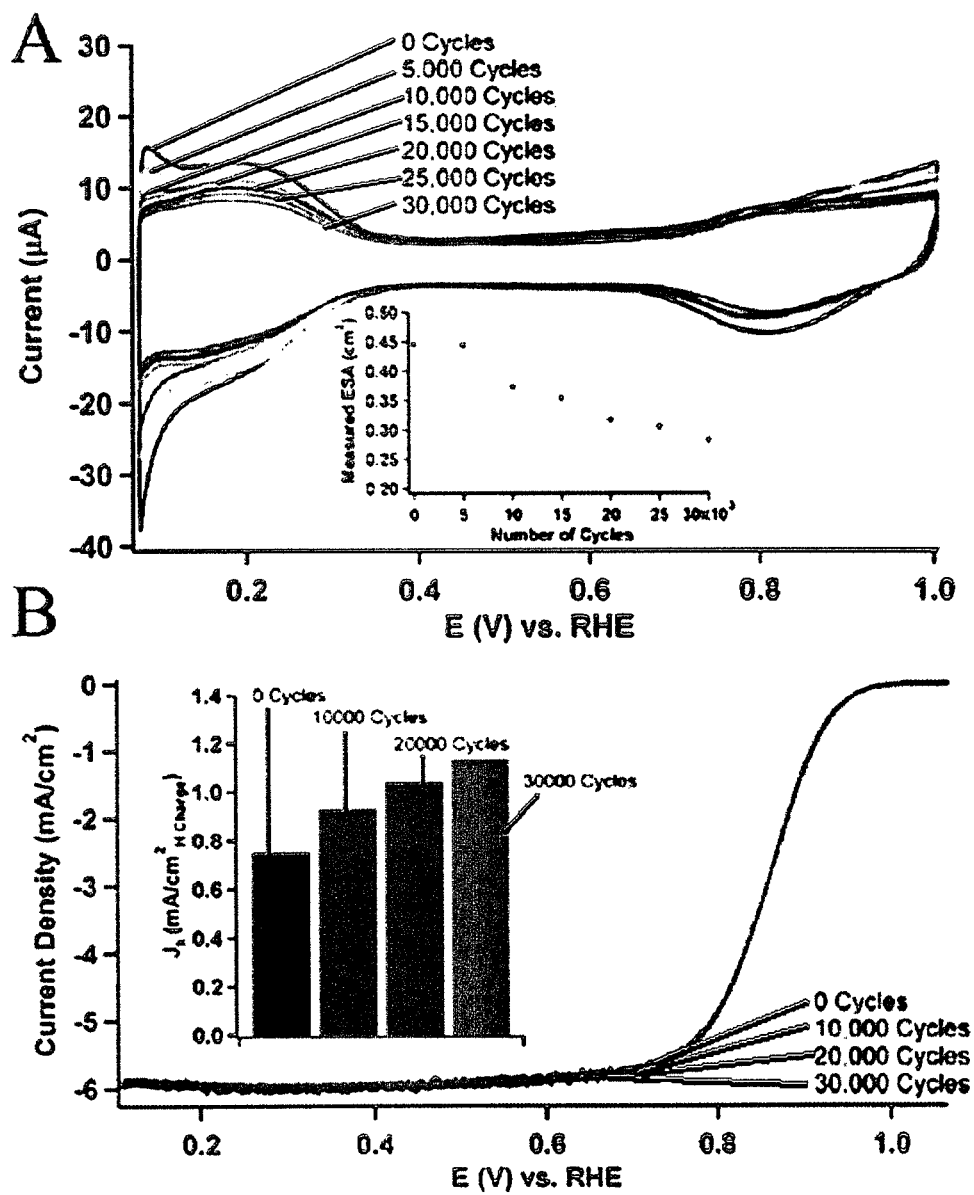
FIGS. 17A and 17C are plots showing cyclic voltammograms obtained in deoxygenated 0.1 M $HClO_4$ solution after 5,000 cycles for the Pt—Pd NW/C core shell composites (A) and commercial high performance (HP) Pt/C catalysts (C). The insets show the measured ESA loss as a function of durability cycling for the Pt—Pd NW/C composites (A) and HP Pt/C catalysts (C).
FIGS. 17B and 17D are plots showing the polarization curves (anodic sweep direction) obtained in an oxygen saturated 0.1 M $HClO_4$ solution at 1,600 rpm after 10,000 cycles for the Pt—Pd NW/C composites (B) and the HP Pt/C catalysts (D). The insets show the measured area-specific kinetic currents (ECSA) as a function of durability cycling for the Pt—Pd NW/C composites (B) and the HP Pt/C composites (D).
Figure 17:
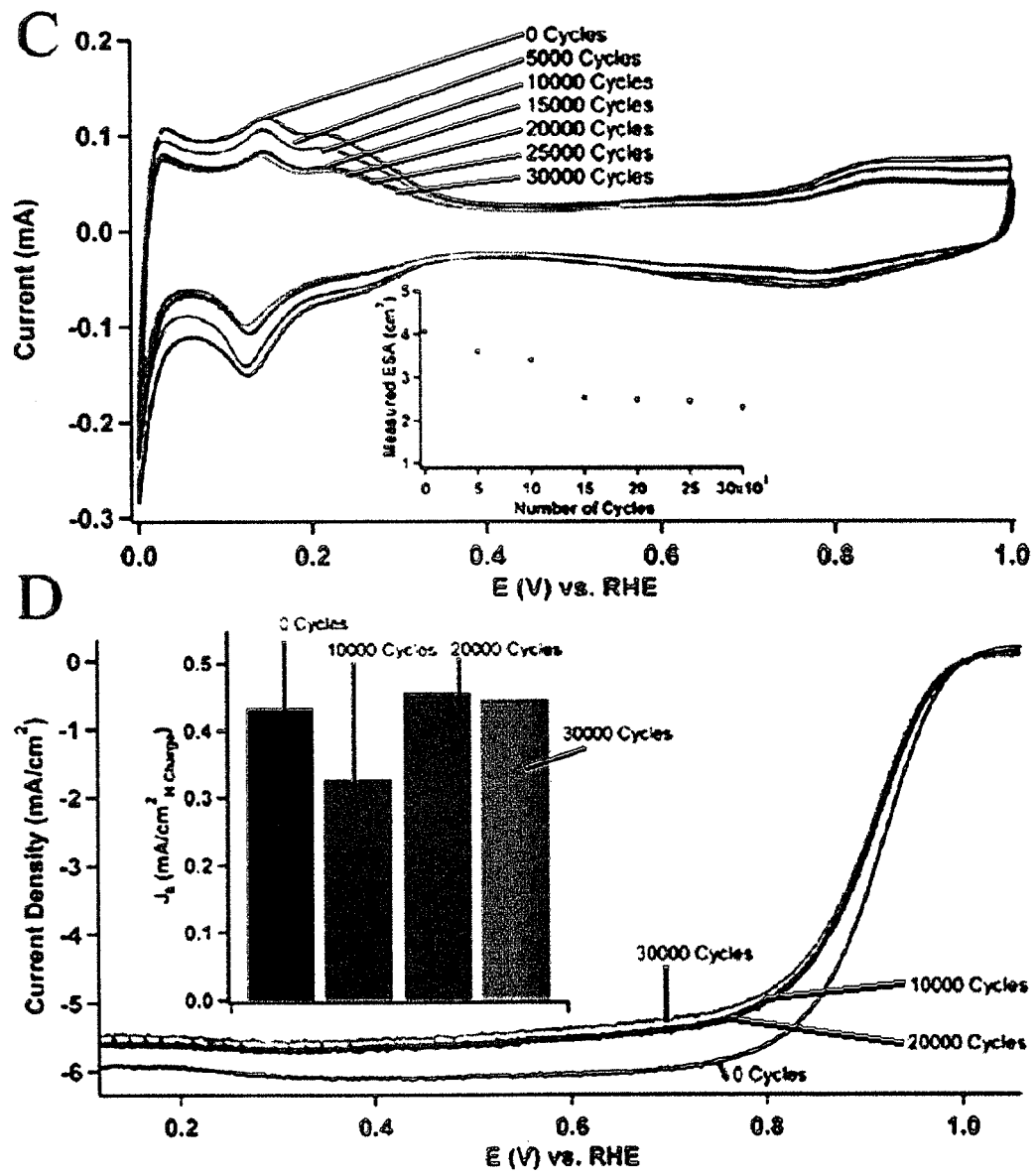
Figure 18:
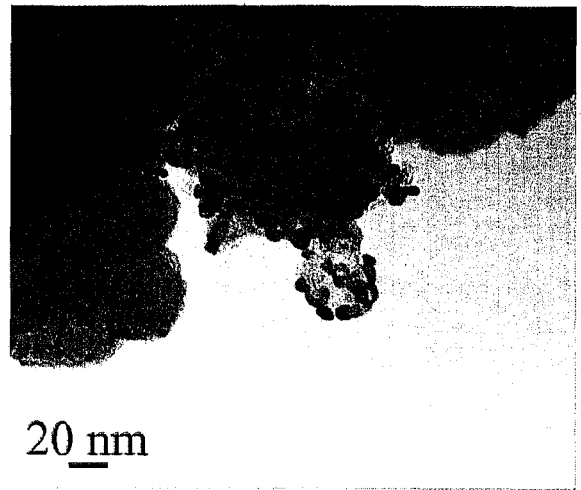
FIG. 18 is a representative TEM image of ozone-treated nanowires after 30,000 cycles associated with the accelerated durability test.

The electrochemical durability of the ozone-treated Pt—Pd NW/C composites was studied under half-cell conditions. Specifically, the potential was cycled between 0.6 and 1.0 V so as to bracket the relevant potential region wherein ORR can feasibly occur in a working fuel cell. The electrode was immersed in naturally aerated 0.1 M $HClO_4$ solution. As illustrated in FIG. 16, the ultrathin Pd NW core-Pt monolayer shell composites displayed outstanding durability in an accelerated half-cell test. Moreover, the ESA and the ECSA could be independently probed by obtaining cyclic voltammograms shown in FIG. 17A and FIG. 17C and polarization curves shown in FIG. 17B and FIG. 17D, respectively, over the course of an accelerated catalyst lifetime (30,000 cycles). After an accelerated lifetime, the ozone-treated Pt—Pd NW/C composites maintained 63% of their initial measured ESA. By contrast, the commercial HP Pt nanoparticulate catalysts maintained only slightly more than 50% of the initial measured ESA. As expected, the ESA of the Pt NP catalysts rapidly decreases to ~50% over the first 15,000 cycles, inevitably reaching a steady state. The rapid decline in ESA observed with nanoparticle catalysts can be attributed to the rapid agglomeration, dissolution, and ripening of the nanoparticles under operating potentials. However, the core-shell nanowires displayed a more linear decline in the ESA, and by 15,000 cycles, the nanowires still retained more than 80% of their original ESA. The steady decline in ESA in Pt—Pd core-shell catalysts has been attributed to the preferential dissolution of Pd from the catalyst core. This observation also supports that the nanowire morphology does not undergo either significant aggregation or ripening. A representative TEM image of ozone-treated Pt—Pd NW samples after 30,000 cycles is shown in FIG. 18. As expected, the long nanowires have been converted largely into wire fragments with lengths that are commensurate with the single crystalline segments present in the initial long nanowires. Upon the basis of the fragmentation pattern of the nanowires, the loss of ESA can be attributed largely to the preferential dissolution of the nanowires at the interconnects between the single crystalline segments and to the concomitant formation of some nanoparticles. In addition to monitoring the ESA, the surface area activity of the ozone-treated Pt—Pd NW/C composites and commercial nanoparticles was also studied over the course of a catalyst lifetime. Interestingly, the ozone-treated area-specific activity of the ozone treated Pt—Pd NW/C composites increases by more than 1.5 fold over the course of the accelerated test, despite nearly a 40% loss in ESA. In fact, there is no substantial change either in the half wave potential (i.e., 3 mV loss after 30 000 cycles) or in the diffusion current of the polarization curve even after 30,000 cycles, which suggests that there is no overall loss in activity from the electrode.

It is believed that the preferential dissolution of Pd from the core in combination with a restructuring of the platinum monolayer mutually contribute to enhance the performance of the catalyst and to prevent corrosion of the Pt monolayer. By contrast, the surface area activity of the commercial HP Pt nanoparticles remains essentially unchanged after 30,000 cycles. However, it is important to highlight that there is a substantial loss of activity greater than 25% during the first 5000 and 10,000 cycles, which coincides with the rapid decline in the ESA of the nanoparticles and is consistent with a restructuring of the catalyst. The polarization curves show a significant decline in the half wave potential of 15 mV and an associated decrease in the diffusion limited current. Hence, the prepared core-shell nanowire catalysts maintain far superior durability in terms of both resistance to surface area loss and, more importantly, activity loss when compared with commercial Pt nanoparticle catalysts.

Example 22

Figure 19:
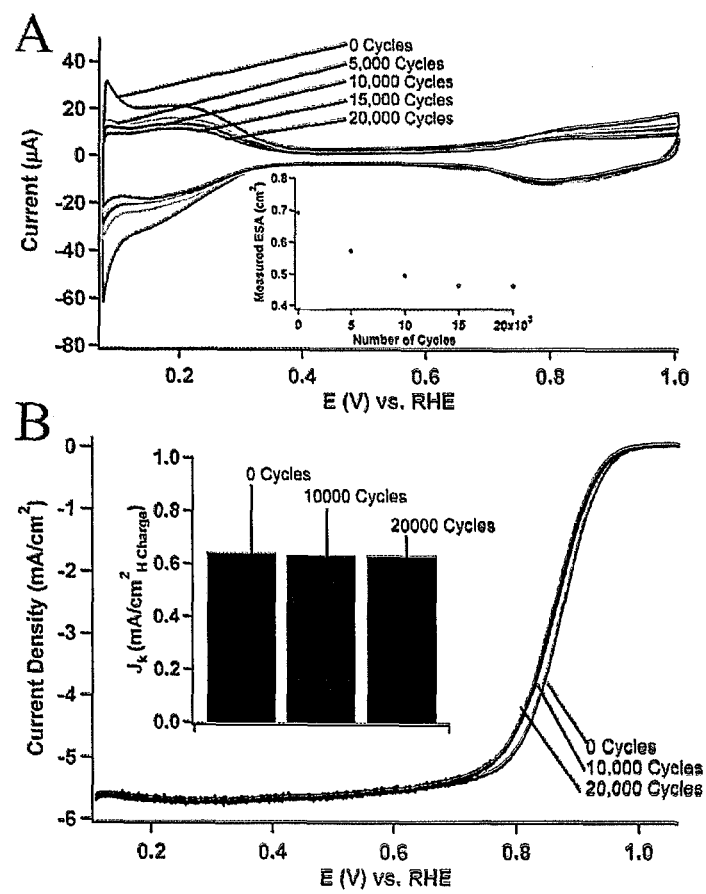
FIG. 19A is a plot showing the cyclic voltammograms obtained in deoxygenated 0.1 M $HClO_4$ after 5,000 cycles for the acid treated Pt—Pd NW/C core shell composites. The inset shows the measured ESA loss as a function of stability cycling for the Pt—Pd NW/C composites.
FIG. 19B is a plot showing the polarization curves (anodic sweep direction) obtained in an oxygen-saturated 0.1 M HClO$_4$ solution at 1600 rpm after 10,000 cycles for the Pt~Pd NW/C composites. The inset shows the measured area-specific kinetic currents (ECSA) as a function of stability cycling for the Pt—Pd NW/C composites.

To explore the dependence of treatment upon the durability of the resulting core-shell nanowire catalyst, the corresponding durability of the acid-treated core-shell nanowires were probed utilizing the procedure outlined in Example 21. FIG. 19 shows a durability of the acid-treated core-shell nanowires. In this case, the acid-treated nanowires were tested until a steady state was achieved in both ESA and surface area activity after 20,000 cycles. After 20,000 cycles, the acid-treated nanowires maintained 63% of their initial ESA, which was significantly lower than that of the ozone-treated nanowires (71%). Acid-treated nanowires also showed no significant enhancement in activity over the 20,000 cycles, whereas the ozone treated nanowires maintained an enhancement of 1.4 fold after 20,000 cycles. Thus, ozone-treated nanowires displayed enhanced electrochemical durability compared to the acid-treated nanowires. This observation is consistent with both the electron microscopy and the electrochemical activity results.

Example 23

The protocol described in Example 1 was modified by employing a bimetallic composite. In particular, the unsupported $Pd_{1-x}Au_x$ NWs were prepared by dissolving a total of 0.056 mmol of palladium nitrate (Alfa Aesar, 99.9%) and tetrachloroauric acid hydrate ($HAuCl_4 \cdot xH_2O$, Alfa Aesar, 99.999%) in 7 mL of toluene. A stoichiometric ratio of the metal precursors needed to achieve the intended NW composition was added to the toluene to achieve the desired NW composition, $Pd_{1-x}Au_x$, with x ranging between 0 and 0.75. For example, the $Pd_7Au_3$ NWs were prepared from a mixture of 0.0392 mmol of $Pd(NO_3)_2$ and 0.0168 mmol of $HAuCl_4 \cdot xH_2O$, representing 70% and 30%, respectively, of the combined 0.056 mmol of metal precursor added to the toluene solution.

Subsequently, octadecylamine (400 mg, ODA, Acros Organics, 90%) and dodecyltrimethylammonium bromide (60 mg, DTAB, TCI, >99%) were also added to the toluene, serving as a shape directing agent and a phase transfer catalyst, respectively.

Once the precursor solution was prepared, the mixture was kept under an inert $N_2$ atmosphere utilizing standard Schlenk conditions and homogenized by sonication for 20 min. In a separate vial, a reducing agent solution of sodium borohydride (13 mg, $NaBH_4$, Alfa Aesar, 98%) was prepared in 2 mL of deoxygenated distilled water. The reduction of the metal precursors was accomplished by injecting the reducing agent solution into the precursor solution dropwise, while stirring, thereby resulting in the evolution of a reddish-brown colored solution. Completion of the reaction was signaled by the formation of a black solution after ~1 h.

The product was isolated from the reaction mixture by first diluting the reaction mixture with 2 mL aliquots of distilled water and chloroform. The black organic phase was removed, diluted with 10 mL of absolute ethanol, and centrifuged in order to precipitate the prepared NWs. The product was then washed three additional times with absolute ethanol. To support the prepared NWs on nanostructured carbon, the ethanol was entirely removed from the isolated NWs and the black powder was then dispersed into 6 mL of chloroform, forming a homogeneous black mixture. The Vulcan XC-72R carbon support (6 mg of dry powder, Cabot) was added to this mixture and sonicated for 30 min in a bath sonicator. After sonication, the supported NWs ($Pd_{1-x}Au_x$ NW/C) were precipitated from chloroform by centrifugation at 9000 rpm for 30 min and fixed onto the carbon substrate by immersing the isolated powder into hexanes for 12 h. The powder was then removed from the hexanes by centrifugation and dried at 60° C. for 1 h. Finally, a catalyst ink was prepared by rendering the dry powder into ethanol with a concentration of approximately 2 mg/mL.

Example 24

A selective CO adsorption described in Example 3 was employed to remove residual organic impurities from the surface of the ultrathin $Pd_{1-x}Au_x$ NW/C catalysts. Briefly, the electrode was cycled in 0.1 M $HClO_4$ up to a potential of 1.3 V at a rate of 100 mV/s until a stable profile was obtained. Thereafter, the electrode was immersed in a CO-saturated electrolyte for 30-45 min so as to selectively displace residual organic impurities from the surface of the NWs. The electrode was then washed in ultrapure water and transferred to a fresh deoxygenated electrolyte wherein a CO stripping cyclic voltammogram (CV) was obtained by cycling the potential up to 1.15 V. The CO adsorption/stripping process was repeated for an additional two times or until the CO stripping profile was reproducible. Once a pristine surface was obtained, the deposition of a PtML at the surface of the $Pd_{1-x}Au_x$ NW/C was accomplished by a two-step method, wherein first a monolayer of Cu ad-atoms was deposited by Cu underpotential deposition (UPD), and subsequently, the Cu ad-atoms were exchanged for Pt atoms by galvanic displacement after immersion into a platinum precursor solution.

Example 25

The measurement of the ORR performance of the catalyst samples from Examples 23 and 24 was performed by employing the thin-layer rotating disk electrode method. First, CVs were obtained in deoxygenated electrolyte at a scan rate of 20 mV/s so as to establish the electrochemically accessible surface area (ESA). The ESA is calculated in this case by converting the average of the hydrogen adsorption and desorption charge (after correcting for the double layer) into a real surface area utilizing the 0.21 µC/cm² as a known conversion factor. In the case of as-prepared Pd NWs, it is important to note that both adsorption and absorption of hydrogen contribute to the measured charge, thereby rendering the calculated ESA as an approximate overestimation of the true ESA. Therefore, the calculated specific activities within this manuscript represent a lower limit of the potential activity derived from these nanostructures. Furthermore, in the case of the $Pd_{1-x}Au_x$ NWs, the gold atoms do not actually undergo hydrogen adsorption and desorption, and thus, the reported ESA is related to the presence of Pd active sites as opposed to the entire NW surface. The ORR activity of the various catalyst samples is measured by obtaining polarization curves in oxygen saturated electrolytes at 20° C. with the electrode rotating at a rate of 1600 rpm and the potential scanned at a rate of 10 mV/s. The kinetic current density is calculated from the Koutecky-Levich relationship and is then normalized to either the ESA, platinum mass, or platinum group metal mass of the catalyst loaded onto the GCE in order to calculate either the surface area or mass normalized kinetic current (JK) densities. The reported activities represent the average value obtained from activities measured on several separately prepared electrodes. An identical characterization protocol has been conducted on commercial Pt NP/C, which serves herein as a commercial comparative standard for ORR performance.

Example 26

X-ray powder diffraction (XRD) obtained on the prepared $Pd_{1-x}Au_x$ NW/C composites reveals that the NWs are homogeneous alloys with the desired face-centered cubic (FCC) crystal structure. It is evident that the patterns are devoid of peaks that can be attributed to either the elemental palladium or gold phases further highlighting that reduction of the precursors results in uniform alloys. A distinctive shift to lower 2θ in the FCC peaks is observed, as the gold content is increased from x=0 to x=0.75 within the NWs. This trend suggests that the lattice parameter of the alloy uniformly transitions from that of palladium toward that of gold as the gold content is systematically increased in the prepared NWs.

Example 27

In contrast, to a treatment protocol described in Example 9 using a UV-ozone atmosphere pretreatment in combination with a selective CO adsorption process, the surfaces of the alloy $Pd_{1-x}Au_x$ NWs can be purified by employing the selective CO adsorption process alone. It is believed that this observation can be explained by a significant weakening of the interaction with the NW surface as a result of the addition of gold. Hence, the need for less rigorous pretreatment processing in the case of the bimetallic NWs is a significant step toward increasing the practicality of these composites as potential viable electrocatalysts.

Figure 20A:
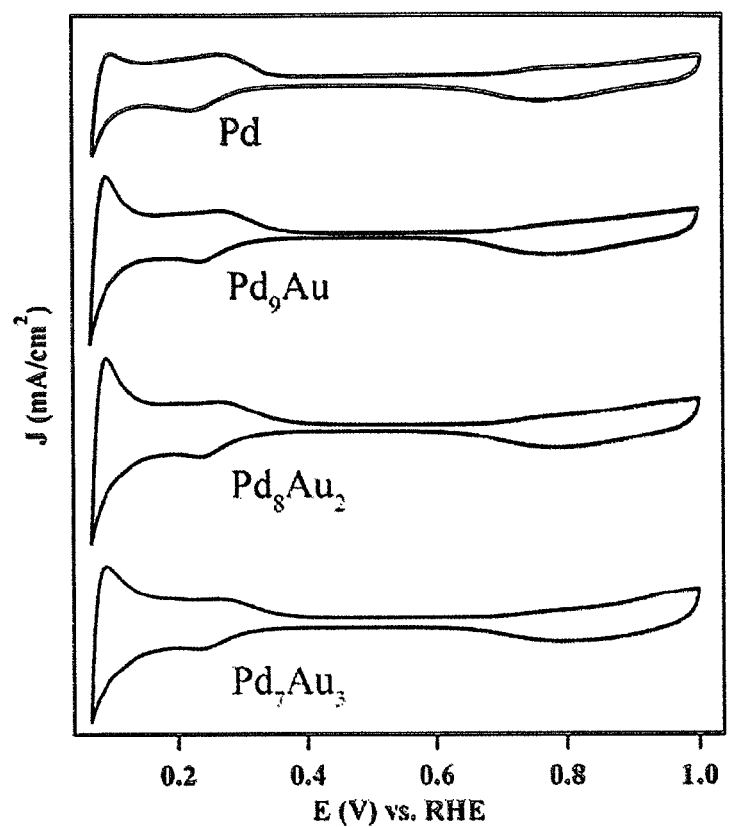
FIG. 20 is a plot showing cyclic voltammograms obtained from purified, ultrathin Pd$_{1-x}$Au$_x$ NWs ("x"=0.1, 0.2, and 0.3) by comparison with elemental Pd NWs before (A) and after (B) the deposition of a Pt$_{ML}$ on the NW surface.

After purification, the quality and electrochemical performance of the prepared $Pd_{1-x}Au_x$ NWs were obtained by the thin-layer rotating disk electrode method. Cyclic voltammograms (CVs) collected from the $Pd_9Au$, $Pd_8Au_2$, and $Pd_7Au_3$ NWs shown in FIG. 20A display prominent features in the 0-0.4 V and the 0.6-1.0 V regions, characteristic of hydrogen adsorption and desorption ($H_{ads}$) and the formation of surface oxide species, respectively. The $H_{ads}$ features in the case of the $Pd_{1-x}Au_x$ NWs are smoother and flatter than that of the analogous Pd NWs. Analogous results were obtained in the case of the 50 nm $Pd_9Au$ NWs, which also displayed a similar $H_{ads}$ profile that is distinctive from that of elemental Pd but is suggestive of a more active surface. A more profound effect of chemical composition upon the resulting CVs is apparent in the oxide reduction peak, which shifts linearly from 762.6 to 800.6 mV as the gold content is correspondingly increased from 0 to 30%.

Figure 20B:
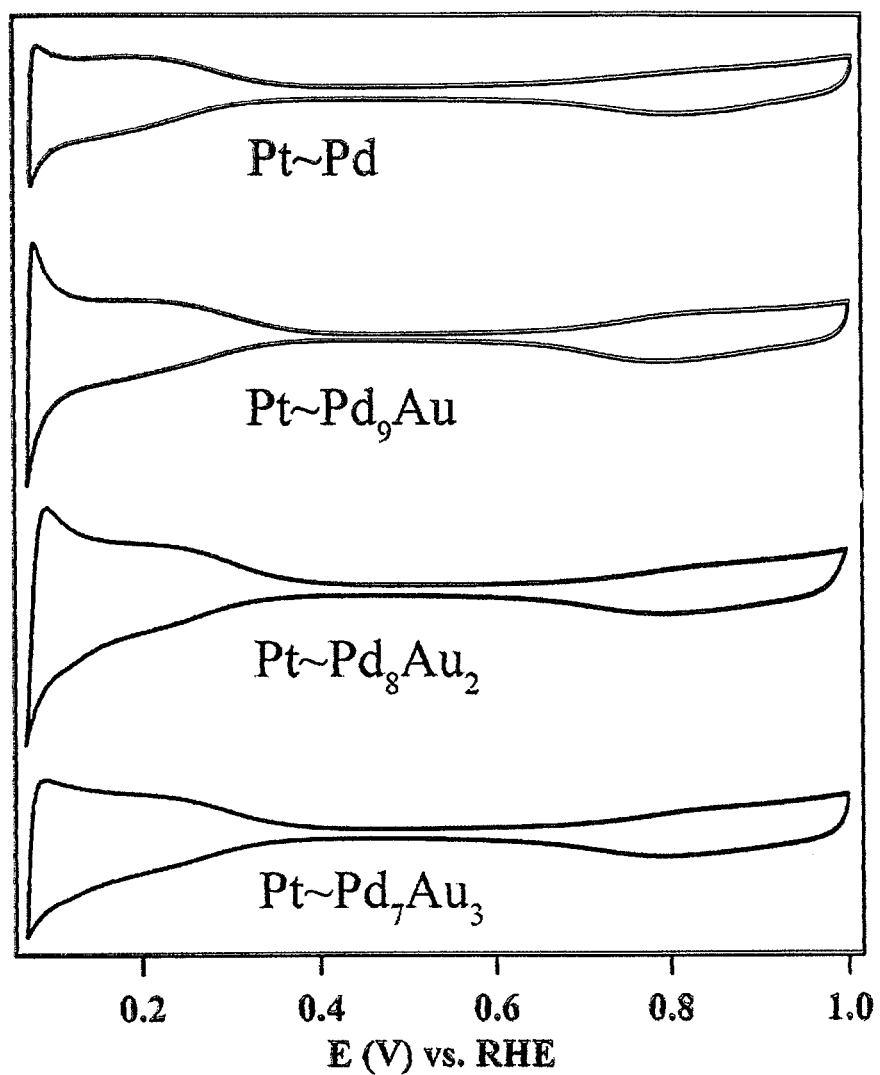

Given the high performance of the $Pd_{1-x}Au_x$ system, the prepared $Pd_{1-x}Au_x$NWs were employed as high quality, 1D substrates for the deposition of a $Pt_{ML}$ shell to form desired Pt~$Pd_{1-x}Au_x$ NW/C composites. The deposition of the $Pt_{ML}$ shell was confirmed by the CVs obtained from the Pt~$Pd_{1-x}Au_x$ NW/C composites after the Cu UPD/galvanic displacement process shown in FIG. 20B. The measured activity represents a significant step forward, since the platinum and corresponding PGM mass activity are several times higher than the analogous activity values typically measured for Pt NP/C.

All publications and patents mentioned in the above specification are herein incorporated by reference in their entireties. Various modifications and variations of the described materials and methods will be apparent to those skilled in the art without departing from the scope and spirit of the invention. Although the disclosure has been described in connection with specific preferred embodiments, it should be understood that the invention as claimed should not be unduly limited to such specific embodiments. Indeed, those skilled in the art will recognize, or be able to ascertain using the teaching herein and no more than routine experimentation, many equivalents to the specific embodiments of the invention described herein. Such equivalents are intended to be encompassed by the following claims

The invention claimed is:

1. A method of removing surfactants or capping agents, comprising:
   providing a noble-metal or non-noble transition metal structure having a plurality of surfactants and/or capping agents on a surface of the metal structure;
   inducing the desorption of the plurality of surfactants and/or capping agents by CO adsorption on the surface of the metal structure by immersing the metal structure into a first solution, wherein the first solution comprises CO; and
   stripping a CO monolayer formed on the surface of the metal structure by electrochemical oxidation in a second solution comprising an electrolyte.

2. The method according to claim 1, wherein the noble-metal structure comprises palladium (Pd), gold (Au), rhodium (Rh), iridium (Ir), ruthenium (Ru), osmium (Os), rhenium (Re), or a combination thereof.

3. The method according to claim 1, wherein the non-noble transition metal structure comprises nickel (Ni), cobalt (Co), iron (Fe), copper (Cu), or a combination thereof.

4. The method according to claim 1, wherein the surfactants are selected from the group consisting of sodium dodecyl sulfate, octadecylamine (ODA), polyvinylpyrrolidone, oleic acid, and a combination thereof.

5. The method according to claim 1, wherein the capping agents are selected from the group consisting of formaldehyde, halide and a combination thereof.

6. The method according to claim 1, wherein immersing the metal structure into a first solution comprises:
   immersing the metal structure into the first solution for 10 to 60 minutes under ambient temperature and pressure, and wherein the first solution is a CO saturated solution.

7. The method according to claim 6, wherein first solution is a solution of perchloric acid with at least 2% CO.

8. The method according to claim 1, wherein stripping a CO monolayer formed on the surface of the metal structure by electrochemical oxidation comprises:
   immersing the CO-coated metal structure into the second solution; and
   applying a potential sweep between 1.1 and 1.3 V at about 20 mV/s to oxidize the CO layer.

9. The method according to claim 8, wherein the second solution is selected from the group consisting of 0.1M-0.2M $H_2SO_4$, and 0.1M-0.2M $HClO_4$.

10. The method according to claim 1, further comprising treating the noble-metal or non-noble transition metal structure having a plurality of surfactants and/or capping agents on the surface of the metal structure with ozone to weaken the interaction of the surfactants and/or the capping agents with a surface of the metal structure.

11. The method according to claim 10, wherein treating the noble-metal or non-noble transition metal structure with ozone weakens the interaction of the surfactants and/or the capping agents with the surface of the metal structure while conserving morphology of the metal structure.

12. The method according to claim 10, wherein the ozone is a gaseous ozone.

13. The method according to claim 12, wherein the gaseous ozone is produced by exposing oxygen in the air to an ultra-violet (UV) light for a period of 5 to 40 minutes.

14. The method according to claim 12, wherein the gaseous ozone is an ultra-violet (UV) light-generated ozone.

15. The method according to claim 10, wherein treating the metal structure with ozone comprises:
   dispersing the metal structure in a solvent; and
   subjecting the metal structure in the solvent to a gaseous ozone for about 5 to about 40 minutes under ambient temperature and pressure.

16. The method according to claim 15, wherein the metal structure is subjected to the gaseous ozone for about 15 minutes under ambient temperature and pressure.

17. The method according to claim 1, further comprising washing the noble-metal or non-noble transition metal structure having a plurality of surfactants and/or capping agents on the surface of the metal structure with an acid to weaken the interaction of the surfactants and/or the capping agents with a surface of the metal structure.

18. The method according to claim 17, wherein the acid is a glacial acetic acid.

19. The method according to claim 17, wherein washing the metal structure with the acid comprises:

sonicating the metal structure in the acid for about 10-60 minutes under ambient temperature and pressure; and refluxing the metal structure in the acid for about 5 to about 120 minutes under an elevated temperature and ambient pressure.

20. The method according to claim 19, wherein the acid is a glacial acetic acid.

21. The method according to claim 19, wherein refluxing the metal structure in the acid lasts for about 60 minutes under 50° C.

22. A method of activating electrocatalyst, comprising:

forming a metal electrocatalyst having a plurality of surfactants or capping agents on a surface of said metal electrocatalyst;

inducing the desorption of the plurality of surfactants or capping agents by CO adsorption on the surface of said metal electrocatalyst by immersing the metal electrocatalyst into a first solution, wherein the first solution comprises CO; and stripping a CO monolayer formed on the surface of the metal electrocatalyst by electrochemical oxidation in a second solution comprising an electrolyte and forming an activated electrocatalyst.

23. The method according to claim 22, wherein the electrocatalyst comprises palladium (Pd), gold (Au), rhodium (Rh), iridium (Ir), ruthenium (Ru), osmium (Os), rhenium (Re), nickel (Ni), cobalt (Co), iron (Fe), copper (Cu), or alloys or combinations thereof.

24. The method according to claim 22, wherein the surfactants are selected from the group consisting of sodium dodecyl sulfate, octadecylamine (ODA), polyvinylpyrrolidone, oleic acid, and a combination thereof, and wherein the capping agent is selected from the group consisting of formaldehyde, halide, carbon monoxide and a combination thereof.

25. The method according to claim 22, wherein immersing the metal electrocatalyst into a first solution comprises, immersing the electrocatalyst into first solution for 10 to 60 minutes under ambient temperature and pressure, and wherein the first solution is a CO saturated solution.

26. The method according to claim 25, wherein the first solution is a solution of perchloric acid with at least 2% CO.

27. The method according to claim 22, wherein stripping a CO monolayer formed on the surface of the nanostructures by electrochemical oxidation comprises immersing the CO-coated electrocatalyst into the second solution; and applying a potential sweep between 1.1 and 1.3 V at about 20 mV/s to oxidize CO.

28. The method according to claim 27, wherein the second solution is selected from the group consisting of 0.1M-0.2M $H_2SO_4$, and 0.1M-0.2M $HClO_4$.

29. The method according to claim 22, wherein the forming of an activated electrocatalyst further comprises acid washing the electrocatalyst before inducing the desorption of the plurality of surfactants or capping agents.

30. The method according to claim 29, wherein washing the metal structure with the acid comprises:

sonicating the metal structure into the acid for about 10-60 minutes under ambient temperature and pressure; and refluxing the metal structure in the acid for about 5 to about 120 minutes under an elevated temperature and ambient pressure.

31. The method according to claim 30, wherein the acid is a glacial acetic acid.

32. The method according to claim 31, wherein refluxing the metal structure in the acid lasts for about 60 minutes under 50° C.

33. The method according to claim 22, wherein the forming of an activated electrocatalyst further comprises ozone treating the electrocatalyst before inducing the desorption of the plurality of surfactants or capping agents by CO adsorption.

34. The method according to claim 33, wherein the ozone treatment weakens the interaction of the plurality of surfactants or capping agents on the surface of the metal structure while conserving morphology of the metal structure.

35. The method according to claim 33, wherein the ozone is a gaseous ozone.

36. The method according to claim 35, wherein the ozone is a gaseous ozone produced by exposing oxygen in the air to an ultra-violet (UV) light for a period of 5 to 40 minutes.

37. The method according to claim 35, wherein the gaseous ozone is an ultra-violet (UV) light-generated ozone.

38. The method according to claim 33, wherein treating the metal structure with ozone comprises:

dispersing the metal structure in a solvent; and subjecting the metal structure in the solvent to a gaseous ozone for about 5 to about 40 minutes under ambient temperature and pressure.

39. The method according to claim 38, wherein the metal structure is subjected to the gaseous ozone for about 15 minutes under ambient temperature and pressure.

40. A method of synthesizing activated electrocatalytic nanostructures, comprising:

forming nanostructures by solution-based synthesis utilizing a surfactant, a capping agent or a combination thereof; and activating the nanostructures by a process comprising inducing the desorption of the surfactant, the capping agent or the combination thereof by CO adsorption on the surface of the nanostructures by immersing the nanostructures into a first solution, wherein the first solution comprises CO, and stripping a CO monolayer formed on the surface of the nanostructures by electrochemical oxidation in a second solution comprising an electrolyte to form the activated electrocatalytic nanostructures.

41. The method according to claim 40, wherein the nanostructures have a morphology of a nanosheet, a nanorod, a nanotube, a nanowire, a core-shell nanostructure or a combination thereof.

42. The method according to claim 40, wherein the nanostructures comprise an activated crystal lattice made from palladium (Pd), gold (Au), rhodium (Rh), iridium (Ir), ruthenium (Ru), osmium (Os), rhenium (Re), nickel (Ni), cobalt (Co), iron (Fe), copper (Cu), or alloys or combinations thereof.

43. The method according to claim 40, wherein the process of forming the nanostructures comprises mixing a salt of a metal with a surfactant, a capping agent or a combination thereof in a solution; and adding a reducing agent to form the nanoparticles.

44. The method according to claim 43, wherein the salt of the metal is selected from nitrate, sulfate, chloride, acetylacetonate, ammonium hexachloroplatinate, ammonium hexachloroiridate, and combinations and mixtures thereof.

45. The method according to claim 43, wherein the reducing agent is $NaBH_4$ or $N_2H_4$.

46. The method according to claim 40, wherein the surfactant is selected from the group consisting of sodium dodecyl sulfate, octadecylamine (ODA), polyvinylpyrrolidone, oleic acid, and a combination thereof.

47. The method according to claim 40, wherein the capping agent is selected from the group consisting of formaldehyde, halide, carbon monoxide and a combination thereof.

48. The method according to claim 40, further comprising,
depositing the nanostructures on a surface of a carbon based electrode to from a uniform catalyst layer before immersing the nanostructures into a first solution,
wherein immersing the nanostructures into a first solution comprises immersing the nanostructure coated carbon electrode into the first solution for 10 to 60 minutes under ambient temperature and pressure.

49. The method according to claim 48, wherein first solution is a solution of perchloric acid with at least 2% CO.

50. The method according to claim 40, wherein stripping a CO monolayer formed on the surface of the nanostructures by electrochemical oxidation comprises
immersing the CO coated nanostructures into the second solution; and
applying a potential sweep between 1.1 and 1.3 V at about 20 mV/s to oxidize CO layer.

51. The method according to claim 48, wherein stripping a CO monolayer formed on the surface of the nanostructures by electrochemical oxidation comprises
immersing the nanostructure coated carbon electrode with the CO monolayer into the second solution; and
applying a potential sweep between 1.1 and 1.3 V at about 20 mV/s to oxidize the CO layer.

52. The method according to claim 50, wherein the electrolytic solution is selected from the group consisting of 0.1M-0.2M $H_2SO_4$, and 0.1M-0.2M $HClO_4$.

53. The method according to claim 51, wherein the electrolytic solution is selected from the group consisting of 0.1M-0.2M $H_2SO_4$, and 0.1M-0.2M $HClO_4$.

54. The method according to claim 40, wherein activating the nanostructures further comprises acid washing the nanostructures before inducing the desorption of the surfactant, the capping agent, or the combination thereof by CO adsorption.

55. The method according to claim 40, wherein activating the nanostructures further comprises ozone treating the nanostructures before inducing the desorption of the surfactant, the capping agent, or the combination thereof by CO adsorption.

56. A method of activating electrocatalytic nanoparticles, comprising:
inducing the desorption of a surfactant, a capping agent or a combination thereof by CO adsorption on the surface of the nanoparticles to form a CO monolayer by immersing the electrocatalytic nanoparticles into a first solution, wherein the first solution comprises CO, and
stripping the CO monolayer formed on the surface of the nanoparticles by electrochemical oxidation in a second solution comprising an electrolyte to form activated electrocatalytic nanoparticles.

57. The method according to claim 56, further comprising acid washing the nanoparticles before inducing the desorption of the surfactant, the capping agent or the combination thereof by CO adsorption.

58. The method according to claim 56, further comprising ozone treating the nanoparticles before inducing the desorption of the surfactant, the capping agent or the combination thereof by CO adsorption.

59. A method of removing surfactants or capping agents, comprising:
providing a noble-metal or non-noble transition metal structure having a plurality of surfactants and/or capping agents on a surface of the metal structure;
treating the metal structure with ozone to weaken the interaction of the surfactants and/or the capping agents;
inducing the desorption of the surfactant, the capping agent, or the combination thereof by CO adsorption on the surface of the metal structure by immersing the metal structure into a first solution, wherein the first solution comprises CO; and
stripping a CO monolayer formed on the surface of the metal structure by electrochemical oxidation in a second solution comprising an electrolyte.

60. The method according to claim 59, wherein the ozone is a gaseous ozone produced by exposing oxygen in the air to an ultra-violet (UV) light for a period of 5 to 40 minutes.

61. The method according to claim 59, wherein treating the metal structure with ozone comprises:
dispersing the metal structure in a solvent; and
subjecting the metal structure in the solvent to a gaseous ozone for about 5 to about 40 minutes under ambient temperature and pressure.

62. The method according to claim 61, wherein the solvent is an ethanol.

63. A method of removing surfactants or capping agents, comprising:
providing a composite transition metal structure having a plurality of surfactants and/or capping agents on a surface of the metal structure;
inducing the desorption of the plurality of surfactants and/or capping agents by CO adsorption on the surface of the metal structure by immersing the metal structure into a first solution; and
stripping a CO monolayer formed on the surface of the metal structure by electrochemical oxidation in a second solution comprising an electrolyte.

64. The method according to claim 63, wherein the composite transition metal structure is selected from PdPt, PdCu, PdAu, PtFe, and PtAu.

65. The method according to claim 63, wherein the composite transition metal structure comprises nanoparticles having $Pd_{1-x}Au_x$, where x is selected from 0.1 to 0.75.

* * * * *